(12) United States Patent
Colaitis et al.

(10) Patent No.: US 11,928,796 B2
(45) Date of Patent: Mar. 12, 2024

(54) METHOD AND DEVICE FOR CHROMA CORRECTION OF A HIGH-DYNAMIC-RANGE IMAGE

(71) Applicant: InterDigital VC Holdings, Inc., Wilmington, DE (US)

(72) Inventors: Marie-Jean Colaitis, Cesson-Sevigne (FR); David Touze, Cesson-Sevigne (FR); Nicolas Caramelli, Cesson-Sevigne (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 496 days.

(21) Appl. No.: 16/978,209

(22) PCT Filed: Nov. 30, 2018

(86) PCT No.: PCT/US2018/063218
§ 371 (c)(1),
(2) Date: Sep. 4, 2020

(87) PCT Pub. No.: WO2019/108882
PCT Pub. Date: Jun. 6, 2019

(65) Prior Publication Data
US 2021/0042892 A1   Feb. 11, 2021

(30) Foreign Application Priority Data

Dec. 1, 2017 (EP) .................................... 17306694
Dec. 20, 2017 (EP) .................................... 17306838

(51) Int. Cl.
*G06T 5/00* (2006.01)
*G06T 3/40* (2006.01)
*G06T 5/20* (2006.01)

(52) U.S. Cl.
CPC ................ *G06T 5/009* (2013.01); *G06T 3/40* (2013.01); *G06T 5/20* (2013.01); *G06T 5/007* (2013.01);
(Continued)

(58) Field of Classification Search
None
See application file for complete search history.

(56) References Cited

U.S. PATENT DOCUMENTS 4,488,245 A   12/1984  Dalke et al.
5,565,931 A   10/1996  Girod
(Continued)

FOREIGN PATENT DOCUMENTS

CN   107197248 A   9/2017
CN   107211141 A   9/2017
(Continued)

OTHER PUBLICATIONS

Anonymous, "Reference software for ITU-T H.265 high efficiency video coding", International Telecommunication Union, ITU-T Telecommunication Standardization Sector of ITU, Series H: Audio-visual and Multimedia Systems, Infrastructure of audiovisual services—Coding of moving video, Recommendation ITU-T H.265.2, Oct. 2014, pp. 1-12.
(Continued)

*Primary Examiner* — Randolph I Chu
(74) *Attorney, Agent, or Firm* — CONDO ROCCIA KOPTIW LLP

(57) ABSTRACT

Encoding can involve correcting chroma components representing the chroma of an input image according to a first component representing a mapping of the luminance component of said input image used for reducing or increasing the dynamic range of said luminance component, and a reconstructed component representing an inverse mapping
(Continued)

of said first component. At least one correction factor according to said at least one scaled chroma components can also be obtained and transmitted. Decoding can involve scaled chroma components being obtained by multiplying chroma components of an image by at least one corrected chroma correction function depending on said at least one correction factor. Components of a reconstructed image can then be derived as a function of said scaled chroma components and a corrected matrix that depends on an inverse of a theoretical color space matrix conversion and said at least one correction factor.

18 Claims, 8 Drawing Sheets

(52) U.S. Cl.
CPC ............... *G06T 2207/10024* (2013.01); *G06T 2207/20208* (2013.01)

(56) References Cited

U.S. PATENT DOCUMENTS

| | | | |
|---|---|---|---|
| 7,256,841 B2 | 8/2007 | Hibi et al. | |
| 9,129,445 B2* | 9/2015 | Mai | H04N 1/646 |
| 9,589,313 B2 | 3/2017 | Wallace | |
| 11,279,768 B1* | 3/2022 | Arlen | A61K 45/06 |
| 11,423,522 B2* | 8/2022 | Andrivon | G06T 5/009 |
| 2007/0133071 A1 | 6/2007 | Noyes et al. | |
| 2016/0205367 A1* | 7/2016 | Wallace | G06T 5/009 348/571 |
| 2017/0085879 A1* | 3/2017 | Minoo | H04N 19/177 |
| 2017/0105014 A1 | 4/2017 | Lee et al. | |
| 2018/0005358 A1 | 1/2018 | Lasserre et al. | |
| 2018/0131841 A1 | 5/2018 | Mahmalat et al. | |
| 2018/0249182 A1* | 8/2018 | Andrivon | H04N 19/184 |
| 2019/0164262 A1* | 5/2019 | Cellier | G06T 5/009 |
| 2020/0106928 A1* | 4/2020 | Thebault | H04N 1/6075 |
| 2020/0219236 A1* | 7/2020 | Olivier | H04N 9/77 |
| 2020/0349685 A1* | 11/2020 | Andrivon | G06F 17/16 |
| 2020/0394774 A1* | 12/2020 | Andrivon | H04N 19/65 |
| 2021/0042892 A1* | 2/2021 | Colaitis | G06T 5/20 |

FOREIGN PATENT DOCUMENTS

| | | |
|---|---|---|
| EP | 3 242 482 A1 | 11/2017 |
| EP | 3375190 A1 | 9/2018 |
| WO | 2013/075589 A1 | 5/2013 |
| WO | WO 2017196869 A1 | 11/2017 |

OTHER PUBLICATIONS

Anonymous, "High-Performance Single Layer High Dynamic Range (HDR) System for use in Consumer Electronics devices; Part 1: Directly Standard Dynamic Range (SDR) Compatible HDR System (SL-HDR1)", EBU Operating Eurovision, European Broadcasting Union, ETSI TS 103 433-1 V1.2.1, Aug. 2017, pp. 1-123.

Diaz et al., "Integrating HEVC Video Compression with a High Dynamic Range Video Pipeline", SMPTE Motion Imaging Journal, vol. 125, No. 1, Jan. 2016, pp. 14-21.

Francois et al., "A single-layer HDR video coding framework with SDR compatibility", SMPTE Motion Imaging Journal, vol. 126, N° 3, Apr. 1, 2047, pp. 16-22.

Pouli et al., "Color Correction for Tone Reproduction", Color and Imaging Conference, Nov. 1, 2013, pp. 215-220.

Anonymous, "High Dynamic Range Electro-Optical Transfer Function of Mastering Reference Displays", Society of Motion Picture and Television Engineers, SMPTE ST 2084:2014, Aug. 16, 2014, pp. 1-14.

Anonymous, "Advanced video coding for generic audiovisual services", International Telecommunication Union Standard, ITU-T H.264, Series H: Audiovisual and Multimedia Systems, Infrastructure of audiovisual services—coding of moving video, Jan. 2012, pp. 1-680.

Anonymous, "High-Performance Single Layer High Dynamic Range (HDR) System for use in Consumer Electronics devices; Part 3: Enhancements for Hybrid Log Gamma (HLG) transfer function based High Dynamic Range (HDR) Systems (SL-HDR3)", EBU Operating Eurovision, European Broadcasting Union, ETSI TS 103 433-3 V1.1.1, Mar. 2020, pp. 1-27.

"Users of CTA-861, A DTV Profile for Uncompressed High-Speed Digital Interfaces", Consumer Technology Association, CTA-861-G, CTA Technology & Standards Department, Nov. 2, 2017, 218 pages.

Draft ETSI TS 103 433-2 V0.0.4, "High-Performance Single Layer High Dynamic Range (HDR) System for use in Consumer Electronics devices, Part 2: Enhancements for Perceptual Quantization (PQ) transfer function based High Dynamic Range (HDR) Systems (SL-HDR2)", European Telecommunications Standards Institute (ETSI), Nov. 2017, 42 pages.

ITU-T, "Advanced Video Coding for Generic Audiovisual Services", Recommendation H.264, Telecommunication Standardization Sector of ITU, Series H: Audiovisual and Multimedia Systems, Infrastructure of Audiovisual Services—Coding of Moving Video, Apr. 2017, 812 pages.

ITU-R, "Colour Gamut Conversion from Recommendation ITU-R BT2020 to Recommendation BT,709", International Telecommunication Union, ITU-R Radiocommunication Sector of ITU, Report ITU-R BT.2407-0, Oct. 2017, 47 pages.

ITU-T, "High Efficiency Video Coding", Recommendation H.265, Series H: Audiovisual and Multimedia Systems, Infrastructure of Audiovisual Services—Coding of Moving Video, Feb. 2018, 692 pages.

IEEE, "IEEE Standard for Second-Generation IEEE 1857 Video Coding", IEEE Std. 1857.4™—2018, IEEE Standards Association, IEEE Computer Society, 2018, 199 pages.

ITU-R, "Image Parameter Values for High Dynamic Range Television for Use in Production and International Programme Exchange", Recommendation ITU-R BT.2100-1, BT Series, Broadcasting Service (Television), Geneva, Jun. 2017, 16 pages.

SMPTE, "Dynamic Metadata for Color Volume Transform—Core Components", The Society of Motion Picture and Television Engineers (SMPTE), ST 2094-1:2016, May 18, 2016, 15 pages.

SMPTE, "Mastering Display Color Volume Metadata Supporting High Luminance and Wide Color Gamut Images", ST 2086:2014, Oct. 13, 2014, pp. 1-6.

* cited by examiner

METHOD AND DEVICE FOR CHROMA CORRECTION OF A HIGH-DYNAMIC-RANGE IMAGE

CROSS REFERENCE TO RELATED APPLICATIONS

This application is the national stage entry under 35 U.S.C. § 371 of International Application PCT/US2018/063218, filed Nov. 30, 2018, which was published in accordance with PCT Article 21(2) on Jun. 6, 2019, in English, and which claims the benefit of European Patent Application No. 17306694.5, filed Dec. 1, 2017 and European Patent Application No. 17306838.8, filed Dec. 20, 2017.

1. FIELD

At least one embodiment relates generally to a processing of a video or an image.

2. BACKGROUND

The present section is intended to introduce the reader to various aspects of art, which may be related to various aspects of at least one embodiment that is described and/or claimed below. This discussion is believed to be helpful in providing the reader with background information to facilitate a better understanding of the various aspects of at least one embodiment.

The advent of the High Efficiency Video Coding (HEVC) standard (ITU-T H.265 Telecommunication standardization sector of ITU (February 2018), series H: audiovisual and multimedia systems, infrastructure of audiovisual services—coding of moving video, High efficiency video coding, Recommendation ITU-T H.265) enables the deployment of new video services with enhanced viewing experience, such as Ultra HD services. In addition to an increased spatial resolution, Ultra HD format can bring a wider color gamut (WCG) and a higher dynamic range (HDR) than respectively the Standard Color Gamut (SCG) and the Standard Dynamic Range (SDR) of High Definition format currently deployed. Different solutions for the representation and coding of HDR/WCG video have been proposed such as the perceptual transfer function Perceptual Quantizer (PQ) (SMPTE ST 2084, "High Dynamic Range Electro-Optical Transfer Function of Mastering Reference Displays, or Diaz, R., Blinstein, S. and Qu, S. "Integrating HEVC Video Compression with a High Dynamic Range Video Pipeline", SMPTE Motion Imaging Journal, Vol. 125, Issue 1. February, 2016, pp 14-21). Typically, SMPTE ST 2084 allows representing HDR video signal of up to 10 000 $cd/m^2$ peak luminance with only 10 or 12 bits.

SDR backward compatibility with a decoding and rendering apparatus is an important feature in some video distribution systems, such as broadcasting or multicasting systems. A solution based on a single-layer coding/decoding process may be backward compatible, for example SDR compatible, and may leverage legacy distribution networks and services already in place.

Such a single-layer based distribution solution enables both high quality HDR rendering on HDR-enabled Consumer Electronic (CE) devices, while also offering high quality SDR rendering on SDR-enabled CE devices. Such a solution is based on an encoded signal, for example SDR signal, and associated metadata (typically only using a few bytes per video frame or scene) that can be used to reconstruct another signal, for example either SDR or HDR signal, from a decoded signal.

An example of a single-layer based distribution solution may be found in the ETSI technical specification TS 103 433-1 V1.2.1 (August 2017). Such a single-layer based distribution solution is denoted SL-HDR1 in the following.

Additionally, HDR distribution systems (workflows, but also decoding and rendering apparatus) may already be deployed. Indeed, there are a number of global video services providers which include HDR content. However, distributed HDR material may be represented in a format or with characteristics which do not match consumer end-device characteristics. Usually, the consumer end-device adapts the decoded material to its own characteristics. However, the versatility of technologies employed in the HDR TV begets important differences in terms of rendition because of the differences between the consumer end-device characteristics compared to the mastering display used in the production environment to grade the original content. For a content producer, artistic intent fidelity and its rendition to the consumer are of the utmost importance. Thus, "display adaptation" metadata can be generated either at the production stage during the grading process, or under the control of a quality check operator before emission. The metadata enable the conveyance of the artistic intent to the consumer when the decoded signal is to be adapted to end-device characteristics.

An example of a single-layer based distribution solution implements a display adaptation may be found in ETSI technical specification TS 103 433-2 V.0.0.4 (November 2017). Such a single-layer based distribution solution is denoted SL-HDR2 in the following.

Such a single-layer based distribution solution, SL-HDR1 or SL-HDR2, generates metadata as parameters used for the reconstruction or adaptation of the signal. Metadata may be either static or dynamic.

Static metadata means parameters representative of the video content or its format that remain the same for, for example, a video (set of images) and/or a program.

Static metadata are valid for the whole video content (scene, movie, clip . . . ) and may depend on the image content per se or the representation format of the image content. The static metadata may define, for example, image format, color space, or color gamut. For instance, SMPTE ST 2086:2014, "Mastering Display Color Volume Metadata Supporting High Luminance and Wide Color Gamut Images" defines static metadata that describes the mastering display used to grade the material in a production environment. The Mastering Display Colour Volume (MDCV) SEI (Supplemental Enhanced Information) message corresponds to ST 2086 for both H.264/AVC ("*Advanced video coding for generic audiovisual Services*", SERIES H: AUDIOVISUAL AND MULTIMEDIA SYSTEMS, Recommendation ITU-T H.264, Telecommunication Standardization Sector of ITU, April 2017) and HEVC video codecs.

Dynamic metadata is content-dependent information, so that metadata could change with the image/video content, for example for each image or for each group of images. As an example, SMPTE ST 2094:2016, "Dynamic Metadata for Color Volume Transform" defines dynamic metadata typically generated in a production environment. SMPTE ST 2094-30 can be distributed in HEVC and AVC coded video streams using, for example, the Colour Remapping Information (CRI) SEI message.

Such a single-layer based distribution solution, SL-HDR1 or SL-HDR2, comprises an encoding stage and a decoding stage.

At the encoding stage, an incoming HDR video is transformed by a pre-processing stage to an intermediate video and accompanying metadata that are encoded with any legacy video codec and a bitstream is carried throughout an existing legacy distribution network with accompanying metadata conveyed on a specific channel or embedded in the bitstream.

At the decoding stage, the bitstream is decoded to an intermediate video with accompanying metadata that are fed to a post-processing stage to generate a reconstructed HDR video, similar to the incoming HDR video, that is then available for a HDR Consumer Electronics (CE) display.

Another HDR or SDR video may also be reconstructed from the intermediate HDR video and accompanying metadata obtained from a specific channel or from the bitstream.

More precisely, at the pre-processing stage, an image represented with a luminance (luma) component and two chroma components is obtained by applying an Opto-Electrical Transfer Function (OETF) to the linear light HDR values representative of an image of the incoming HDR video. Said an image represented with a luminance (luma) component and two chroma components is then encoded and transmitted.

At the post-processing stage, a decoded image is obtained from a bitstream. The two chroma components of the decoded image are then chroma corrected by multiplying said two chroma components of the decoded image by a chroma correcting function depending on the luminance (luma) of the decoded image. Two corrected chroma components are then derived.

In practice, an integer implementation of the post-processing stage is used. This integer implementation fixes the bit-depth of every internal signal, thus fixing its precision.

In particular the chroma correction function is implemented with a color correction Look-Up Table (LUT) with internal values encoded with a precision, for example, of 11 bits (values between 0 and 2047) and the two corrected chroma components have a precision, for example, of 9 bits+sign (values between −512 and 511).

Sometimes the 11b precision of said color correction LUT is not enough. This is due to the fact that the OETF curve used may be "flat" in the bright areas (when the luminance is high).

Example of such OETF curve are the PQ and HLG transfer functions as defined, for example, in ITU-R Rec. BT.2100.

As the shape of the chroma correction function may also be very flat when the luminance is high, this gives less precision to the two corrected chroma components and some artefacts become visible such as banding, blocking and weird color patches (green and yellow).

3. SUMMARY

The following presents a simplified summary of at least one embodiment in order to provide a basic understanding of some aspects of at least one embodiment. This summary is not an extensive overview of an embodiment. It is not intended to identify key or critical elements of an embodiment. The following summary merely presents some aspects of at least one embodiment in a simplified form as a prelude to the more detailed description provided elsewhere in the application.

According to a general aspect of at least one embodiment, there is provided at the encoding side, a method for correcting chroma components representing the chroma of an input image according to a first component representing a mapping of the luminance component of said input image used for reducing or increasing the dynamic range of said luminance component, and a reconstructed component representing an inverse mapping of said first component. At least one correction factor according to said at least one scaled chroma components is also obtained and transmitted. At the decoding side, scaled chroma components are obtained by multiplying chroma components of an image by at least one corrected chroma correction function depending on said at least one correction factor. Components of a reconstructed image is then derived as a function of said scaled chroma components and a corrected matrix that depends on an inverse of a theoretical color space matrix conversion and said at least one correction factor.

One or more of the present embodiments also provide a device comprising a processor to implement the methods, a signal carrying a bitstream comprising image data, a computer program comprising instructions which when executed by one or more processors cause the one or more processors to carry out the above method. One or more of the present embodiments also provide a computer readable storage medium comprising instructions which when executed by a computer cause the computer to carry out the above method.

The specific nature of at least one embodiment as well as other objects, advantages, features and uses of at least one embodiment will become evident from the following description of examples taken in conjunction with the accompanying drawings.

4. BRIEF DESCRIPTION OF DRAWINGS

In the drawings, examples of at least one embodiment are illustrated. It shows:

Similar or same elements are referenced with the same reference numbers.

5. DESCRIPTION OF AT LEAST ONE EMBODIMENT

Figure 1:
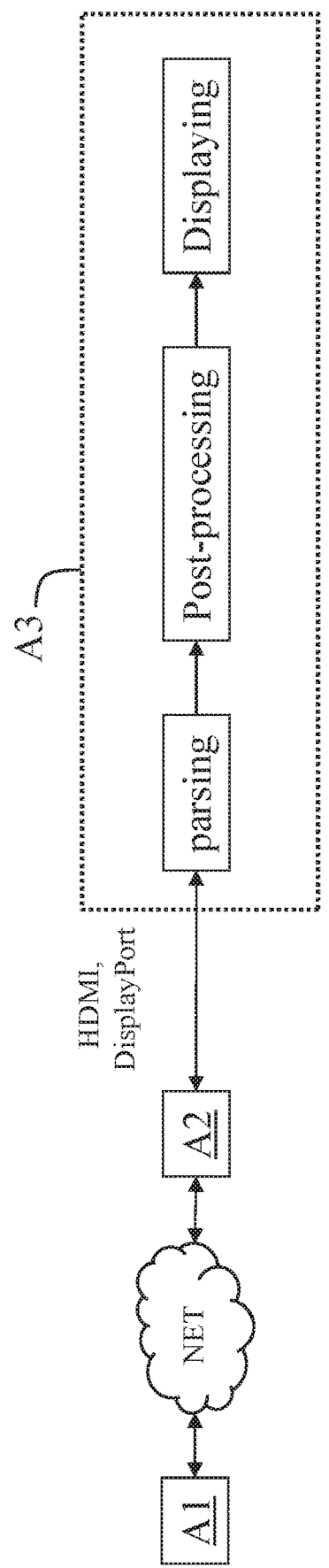
FIG. 1 shows a high-level representation of an end-to-end workflow supporting content delivery for displaying image/video in accordance with at least one embodiment.

At least one embodiment is described more fully hereinafter with reference to the accompanying figures, in which examples of at least one embodiment are shown. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of this application as defined by the claims.

The terminology used herein is for the purpose of describing particular examples only and is not intended to be limiting. As used herein, the singular forms "a", "an", and "the" are intended to include the plural forms as well, unless the context clearly indicates otherwise. It will be further understood that the terms "includes" and/or "including" when used in this specification, specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/". It will be understood that, although the terms first, second, etc. may be used herein to describe various elements, these elements are not be limited by these terms. These terms are only used to distinguish one element from another. For example, a first element could be termed a second element, and, similarly, a second element could be termed a first element without departing from the teachings of this application. Although some of the diagrams include arrows on communication paths to show a primary direction of communication, it is to be understood that communication may occur in the opposite direction to the depicted arrows. Some examples are described with regard to block diagrams and operational flowcharts in which each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved. Reference herein to "in accordance with an example" or "in an example" means that a particular feature, structure, or characteristic described in connection with the example can be included in at least one implementation. The appearances of the expression "in accordance with an example" or "in an example" in various places in the specification are not necessarily all referring to the same example, nor are separate or alternative examples necessarily mutually exclusive of other examples. Reference numerals appearing in the claims are by way of illustration only and shall have no limiting effect on the scope of the claims. Although not explicitly described, the present examples and variants may be employed in any combination or sub-combination.

In the following, image data refer to data, for example, one or several arrays of samples (for example, pixel values) in a specific image/video format, which specifies information pertaining to the pixel values of an image (or a video) and/or information which may be used by a display and/or any other apparatus to visualize and/or decode an image (or video) for example. An image typically includes a first component, in the shape of a first array of samples, usually representative of luminance (or luma) of the image, and a second component and a third component, in the shape of other arrays of samples, usually representative of the chrominance (or chroma) of the image. Some embodiments represent the same information using a set of arrays of color samples, such as the traditional tri-chromatic RGB representation.

A pixel value is represented in one or more embodiments by a vector of C values, where C is the number of components. Each value of a vector is typically represented with a number of bits which can define a dynamic range of the pixel values.

Standard Dynamic Range images (SDR images) are images whose luminance values are typically represented with a smaller number of bits (typically 8) than in High Dynamic Range images (HDR images). The difference between the dynamic ranges of SDR and HDR images is therefore relative, and SDR images can have, for example, more than 8 bits. Because of the smaller number of bits, SDR images often do not allow correct rendering of small signal variations or do not cover high range of luminance values, in particular in dark and bright luminance ranges. In HDR images, the signal representation is typically extended to maintain a higher accuracy of the signal over all or part of its range. For example, at least one embodiment represents an HDR image using 10-bits for luminance, and provides 4 times as many values than an 8-bit representation. The additional values allow a greater luminance range to be represented, and can also allow finer differences in luminance to be represented. In HDR images, pixel values are usually represented in floating-point format (typically at least 10 bits per component, namely float or half-float), the most popular format being openEXR half-float format (for example 48 bits per pixel) or in integers with a long representation, typically at least 16 bits when the signal is linear-light encoded (10 bits at least when it us encoded non-uniformly using the recommendation ST 2084 for example).

Typically, two different images have a different dynamic range of the luminance. The dynamic range of the luminance of an image is the ratio of the maximum over the minimum of the luminance values of the image.

Typically, when the dynamic range of the luminance of an image is below 1000 (for example 500: for example, 100 $cd/m^2$ over 0.2 $cd/m^2$), the image is denoted as a Standard Dynamic Range (SDR) image and when the dynamic range of the luminance of an image is equal to or greater than 1000 (for example 10000: for example, 1000 $cd/m^2$ over 0.1 $cd/m^2$) the image is denoted as an HDR image. Luminance is expressed by the unit candela per square meter ($cd/m^2$). This unit supersedes the term "nit" which may also be used.

At least one embodiment is described for pre-processing, encoding, decoding, and post-processing an image but extends to pre-processing, encoding, decoding, and post-processing a sequence of images (video) because each image of the sequence is sequentially pre-processed, encoded, decoded, and post-processed as described below.

In the following, a component $C_n^m$ designates a component m of an image n. These components $\{C_n^m\}$ with m=1, 2, 3, represent an image $I_n$ in a specific image format. Typically, an image format is characterized by a color volume (for example chromaticity and dynamic range), and a color encoding system (for example RGB, YCbCr . . . ).

FIG. 1 shows a high-level representation of an end-to-end workflow supporting content delivery for displaying image/video in accordance with at least one embodiment.

FIG. 1 includes apparatuses A1, A2 and A3.

The remote apparatuses A1 and A2 are communicating over a distribution network NET that is configured at least to provide a bitstream from apparatus A1 to apparatus A2.

In accordance with an example, the distribution network NET may be a broadcast network, adapted to broadcast still images or video images from apparatus A1 to a plurality of apparatuses A2. DVB-based and ATSC-based networks are examples of such broadcast networks.

In accordance with another example, the distribution network NET may be a broadband network adapted to deliver still images or video images from apparatus A1 to a plurality of apparatuses A2. Internet-based networks, GSM networks, or TV over IP networks are examples of such broadband networks.

In an alternate embodiment, the distribution network NET may be replaced by a physical packaged media on which the encoded image or video stream is stored.

Physical packaged media include, for example, optical packaged media such as Blu-ray disc and Ultra-HD Blu-ray, and memory-based package media such as used in OTT and VoD services.

The apparatus A1 includes at least one device configured to pre-process an input image/video and to encode, in the transmitted bitstream, an image/video and associated formatted metadata resulting of said pre-processing.

The apparatus A2 includes at least one device configured to decode a image/video from a received bitstream and to transmit to the apparatus A3 said decoded image/video and the associated formatted metadata over an uncompressed digital interface such as HDMI or Displayport for example.

The apparatus A3 includes at least one device configured to receive the decoded image/video and associated formatted metadata obtained from the bitstream. The at least one device included in apparatus A3 i may be also configured to obtain parameters by parsing said associated formatted metadata, to reconstruct another image/video by post-processing the decoded image/video (received from apparatus A2) using said parameters.

The at least one device of apparatuses A1, A2 and A3 may belong to a set of devices including, for example, a mobile device, a communication device, a game device, a tablet (or tablet computer), a computer device such as a laptop, a still image camera, a video camera, an encoding chip, a still image server, and a video server (for example a broadcast server, a video-on-demand server, or a web server), a computer device, a set top box, a TV set (or television), a tablet (or tablet computer), a display, a head-mounted display and a rendering/displaying chip.

The format of the metadata may be different according to the format of the transmitted bitstream that depends on the data encoding. Typically, the metadata obtained from the transmitted bitstream may be extracted and conveyed on an uncompressed interface such as specified in CTA-861-G (e.g. as an extended infoFrame). Typically, when coded image/picture are conveyed within an HEVC bitstream, the metadata may be embedded in an HEVC SEI message. For example, such an SEI message may be defined in Annex A of ETSI TS 103 433-1. When conveyed within an AVC bitstream, the metadata may be embedded in an AVC SEI message as defined in Annex B of ETSI TS 103 433-1.

The scope of the at least one embodiment may be not limited to HEVC or AVC formatted SEI message but extends to any message covering the same intent as an SEI message such as "extension data" defined in AVS2 (second generation of Audio Video Standard, GY/T 299.1-2016 or IEEE P1857.4 part 1) for example.

Typically, there is no signaling in the data transmitted on the uncompressed digital interface that indicates whether the formatted metadata associated with the decoded image/video comply with a format of a specific SEI messages, that is that complies with AVC/H.264 or HEVC/H.265 format for example.

Consequently, when metadata, transported with a specific formatting, are carried through the uncompressed interface with an associated and decoded image/video stream, the apparatus A3 cannot identify the formatting of those metadata. For example, the apparatus A3 can not determine if the format of metadata is carried on a AVC SEI message or HEVC SEI message. This can create interoperability issues as the apparatus A3 may assume a particular format to be parsed while the metadata are not formatted according to said particular format. Then, the parsed metadata may be totally corrupted and not usable or if used may beget a very altered image/video reconstructed from the received decoded image/video and those altered metadata.

A straightforward approach may be to fix the format of metadata to a uniquely predetermined format. This can be set as a recommendation or a guideline document followed by stakeholders. But, this means that if the formatting of the metadata is not the fixed one then a translation/conversion mechanism shall occur in the apparatus A2 to adapt the formatting of metadata to an expected formatting carried on the uncompressed interface. This requires extra processing in the apparatus A2 that is against the initial intent of directly transmitting formatted metadata over the uncompressed interface. If the formatting conversion is not operated, metadata carriage is disrupted.

Another approach may be to signal the formatting of the metadata so that the apparatus A3 can operate the parsing responsive to the signaling information. This can be implemented in a specification revision or amendment of CTA-861-G specification for example. But, this approach possibly requires updating every specification or document or product that specifies carriage between the apparatus A3 (also denoted Sink device) and the apparatus A2 (also denoted source device).

According to at least one embodiment, there is provided a device included in the apparatus A3 that is configured to compare a first set of bits of a payload of received formatted metadata with at least one given second set of bits identifying a particular formatting of said received formatted metadata, and to reconstruct an image/video from image data associated with said formatted metadata and parameters obtained by parsing said received formatted metadata according to a particular formatting identified from the result of said comparison.

Such a device then determines/identifies the formatting of the metadata carried on uncompressed interface to be parsed by comparing sets of bits.

This solution is an efficient implementation because it involves few logics, few comparisons and it is included at the very beginning of the parsing process. This solution requires a minor firmware update (CE-friendly) and is compatible with existing interface specifications, avoiding thus any update/amendment of said specification(s).

Figure 2:
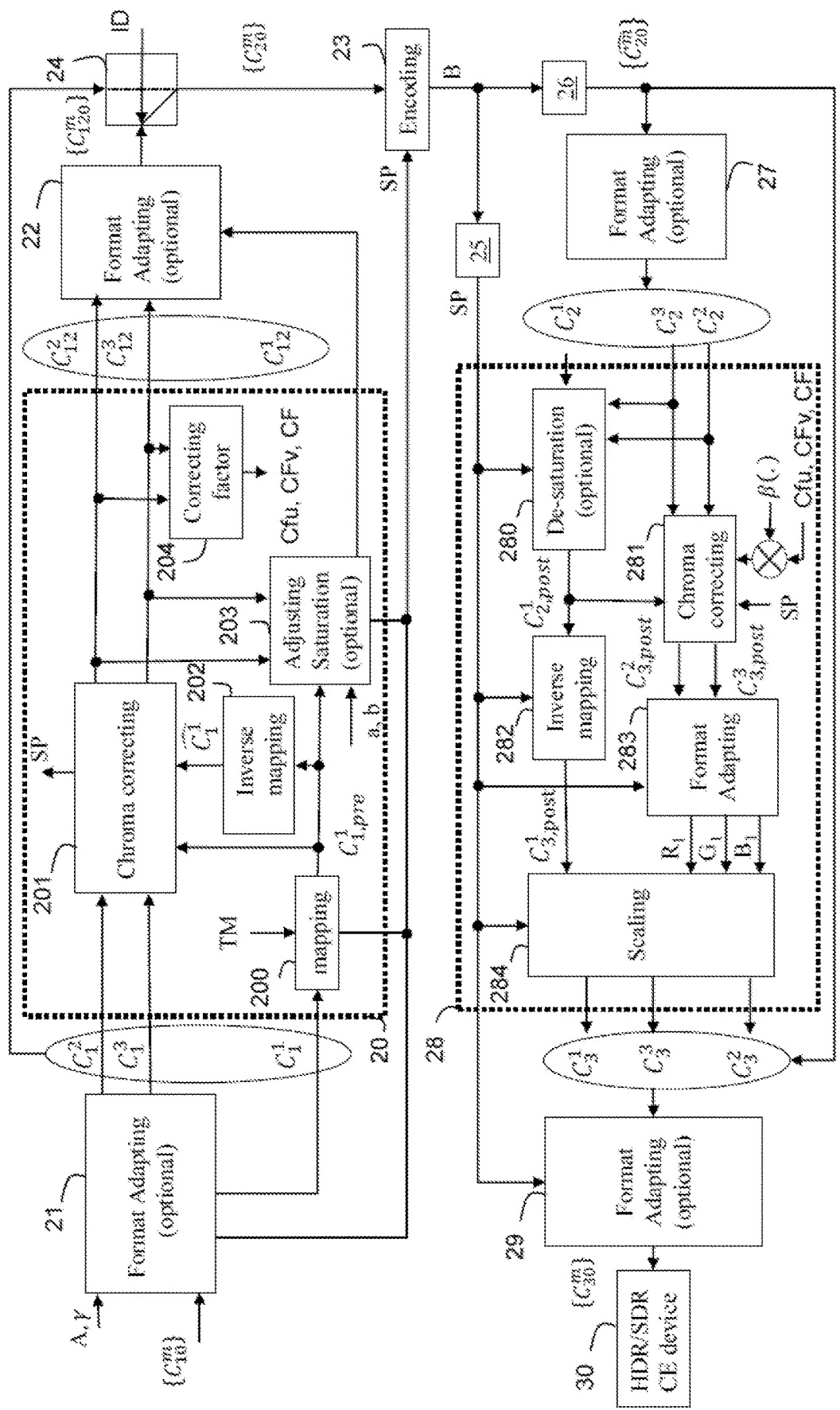
FIG. 2 shows an example of the end-to-end workflow of FIG. 1 supporting delivery to HDR and SDR CE displays in accordance with a single-layer based distribution solution.

FIG. 2 shows an example of the end-to-end workflow of FIG. 1 supporting delivery to HDR and SDR CE displays in accordance with a single-layer based distribution solution. Distribution and parsing part of the end-to-end workflow of FIG. 1 are not explicitly shown in FIG. 2.

Such a single-layer based distribution solution may address SDR direct backward compatibility. That is, the solution leverages SDR distribution networks and services already in place and enables high-quality HDR rendering on HDR-enabled CE devices including high-quality SDR rendering on SDR CE devices.

SL-HDR1 is one example of such a single-layer based distribution solution.

Such a single-layer based distribution solution may also relate to a solution used on distribution networks for which display adaptation dynamic metadata are delivered. This allows, for example, the content to be adapted to a user's display characteristics. For example, dynamic metadata can be delivered along with a PQ HDR video signal. PQ means "Perceptual Quantization" as specified in Rec. ITU-R BT.2100 "Recommendation ITU-R BT.2100-1, Image parameter values for high dynamic range television for use in production and international programme exchange".

The workflow shown in FIG. 2 involves a single-layer based distribution solution with associated SL-HDR metadata. Such a method illustrates an example of the use of a method for reconstructing three components $\{C_{30}{}^m\}$ representative of three components $\{C_{10}{}^m\}$ of an input image. Such a reconstruction is based on three decoded components $\{\hat{c}_{20}^m\}$ representative of a decoded image and the metadata as specified, for example, in SL-HDR1 or SL-HDR2.

An information data ID determines which of the single-layer based distribution solutions (for example SL-HDR1 or SL-HDR2) is used. Usually, in practice only one single-layer based distribution solution may be used and the information data ID may be a given (predetermined) value. If more than one single-layer based distribution solution can be used, then the information data ID may indicate which of these single-layer based distribution solutions is used.

Typically, SL-HDR1 and SL-HDR2 may be used and the information data ID indicates if either SL-HDR1 or SL-HDR2 has to be used.

As shown, the single-layer based distribution solution shown in FIG. 2 includes a pre-processing step 20, an encoding step 23, decoding steps 25 and 26, and a post-processing step 28.

The input and the output of the pre-processing step 20 are triplets of components $\{C_1{}^m\}$ and $\{C_{12}{}^m\}$ respectively, and the input and the output of the post-processing step 28 are triplets of components $\{C_2{}^m\}$ and $\{C_3{}^m\}$ respectively.

The single-layer based distribution solution shown in FIG. 2 may include optional format adaptation steps 21, 22, 27, 29 to adapt the format of three components $\{C_n{}^m\}$ to the input of a further processing to be applied on these components.

For example, in step 21, the format of the three components $\{C_{10}{}^m\}$ may be adapted to a format fitting an input format of the pre-processing step 20 or an input format of an encoding step 23. In step 22 (optional), the format of the three components $\{C_{12}{}^m\}$ may be adapted to a format fitting the input format of the encoding step 23.

In step 27 (optional), the format of the three components $\{\hat{c}_{20}^m\}$ may be adapted to a format fitting the input of the post-processing step 28, and in step 29, the format of the three components $\{C_3{}^m\}$ may be adapted to a format that may be defined from at least one characteristic of a targeted apparatus 30 (for example a Set-Top-Box, a connected TV, HDR/SDR enabled CE device, an Ultra HD Blu-ray disc player).

The format adaptation steps (21, 22, 27, 29) may include color space conversion and/or color gamut mapping (and/or inverse color gamut mapping). Inverse color gamut mapping may be used, for example, when the three decoded components $\{\hat{c}_{20}^m\}$ and the three components $\{C_{30}{}^m\}$ of an output image or the three components $\{C_{10}{}^m\}$ of an input image are represented in different color spaces and/or gamuts.

Usual format adapting processes may be used such as R'G'B'-to-Y'CbCr or Y'CbCr-to-R'G'B' conversions, BT.709-to-BT.2020 or BT.2020-to-BT.709, down-sampling or up-sampling chroma components, etc.

For example, SL-HDR1 may use format adapting processes and inverse gamut mapping as specified in Annex D of the ETSI technical specification TS 103 433-1 V1.2.1 (August 2017).

The input format adaptation step 21 may also include adapting the bit depth of the three components $\{C_{10}{}^m\}$ to bit depth such as 10 bits for example, by applying a transfer function on the three components $\{C_{10}{}^m\}$ such as a PQ or HLG transfer function or its inverse. The Recommendation Rec. ITU-R BT.2100 provides examples of such transfer functions.

In the pre-processing step 20, the three input components $\{C_1{}^m\}$ are decomposed into three components $\{C_{12}{}^m\}$ and a set of parameters SP formed by parameters coming from step 21, 200, 201, 203 and/or 204. The format of the three components $\{C_{12}{}^m\}$ may be optionally adapted during step 22 to get the three components $\{C_{120}{}^m\}$. A switching step 24 determines if the three components $\{C_{20}{}^m\}$ equals either the three components $\{C_{120}{}^m\}$ or the three components $\{C_1{}^m\}$.

In step 23, the three components $\{C_{20}{}^m\}$ may be encoded with any video codec and the output is a signal including the bitstream B. The output signal may be carried throughout a distribution network.

According to variant of step 23, the set of parameters SP and/or the information data ID may be conveyed as associated static and/or dynamic metadata in the bitstream B, or out-of-band (that is not in the bitstream B but either as predetermined values known by the receiver or as a part of another stream on another communication channel, for example using SIP or H.323 protocoles).

According to a variant, the set of parameters SP and/or the information data ID may be conveyed as associated static and/or dynamic metadata on a specific channel.

At least one signal, intended to be decoded by the apparatus A2 of FIG. 1, carries the bitstream B which can include the accompanying metadata.

In a variant, the bitstream B is stored on a storage medium such as a (UltraHD) Blu-ray disk or a hard disk or a memory of a Set-Top-Box for example.

In a variant, at least some accompanying associated metadata is stored on a storage medium such as an (UltraHD) Blu-ray disk or a hard disk or a memory of a Set-Top-Box for example.

In at least one implementation, in step 23, a sequence of at least one triplet of components $\{C_{20}{}^m\}$, each representing an image, and possibly associated metadata, are encoded with a video codec such as an H.265/HEVC codec or an H.264/AVC codec.

In step 25, the set of parameters SP is obtained at least partially either from the bitstream B or from another specific channel. At least one of the parameters of the set of parameters SP may also be obtained from a separate storage medium.

In step 26, the three decoded components $\{\hat{c}_{20}^m\}$ are obtained from the bitstream B.

The post-processing step 28 is a functional inverse, or substantially a functional inverse, of the pre-processing step 20. In the post-processing step 28, the three components $\{C_{30}{}^m\}$ are reconstructed from the three decoded components $\{\hat{c}_{20}^m\}$ and the obtained set of parameters SP.

In more detail, the pre-processing step 20 includes steps 200-204

In step 200, a component $C_{1,pre}^1$ is obtained by applying a mapping function on the component $C_1^1$ of the three components $\{C_1^m\}$. The component $C_1^1$ represents the luminance of the input image.

Mathematically speaking, $$C_{1,pre}^1 = MF(C_1^1) \quad (1)$$

with MF being a mapping function that may reduce or increase the dynamic range of the luminance of an image. Note that its inverse, denoted IMF, may increase or reduce, respectively, the dynamic range of the luminance of an image.

In step 202, a reconstructed component $\hat{c}_1^1$ is obtained by applying an inverse-mapping function on the component $C_{1,pre}^1$:

$$\hat{c}_1^1 = IMF(C_{1,pre}^1) \quad (2)$$

where IMF is the functional inverse of the mapping function MF. The values of the reconstructed component $\hat{c}_1^1$ belong thus to the dynamic range of the values of the component $C_1^1$.

In step 201, the components $C_{12}^2$ and $C_{12}^3$ are derived by correcting the components $C_1^2$ and $C_1^3$ representing the chroma of the input image according to the component $C_{1,pre}^1$ and the reconstructed component $\hat{c}_1^1$.

This step 201 allows control of the colors obtained from the three components $\{C_{12}^m\}$ and allows perceptual matching to the colors of the input image. The correction of the components $C_1^2$ and $C_1^3$ (usually denoted chroma components) may be maintained under control by tuning the parameters of the chroma correcting and inverse mapping steps. The color saturation and hue obtained from the three components $\{C_{12}^m\}$ are thus under control. Such a control is not possible, usually, when a non-parametric mapping function (step 200) is used.

In step 204, at least one correction factor $CF_U$, respectively $CF_V$ may be obtained according to the component $C_{12}^2$, respectively the component $C_{12}^3$.

According to an embodiment, for each value $C_{12}^2(i)$ of the component $C_{12}^2$:

```
If (C₁₂²(i) >= 0)
    CF_U(i) = C₁₂²(i) / MaxVal_U
else
    CF_U(i) = - C₁₂²(i) / (MaxVal_U +1)
CF_U = fct(CF_U(i), CF_U)
If (C₁₂³(i) >= 0)
    CF_V(i) = C₁₂³(i) / MaxVal_V
else
    CF_V(i) = - C₁₂³(i) / (MaxVal_V +1)
CF_V = fct(CF_V(i), CF_V)
``` where $MaxVal_U = MaxVal_V = 511$, for example and fct(.) is a function representing the relation of dependency between the current computed correction factor $CF_U(i)$, respectively $CF_V(i)$, and the current reference correction factor $CF_U$, respectively $CF_V$.

According to an embodiment, the function fct(.) is a max function between the current computed correction factor $CF_U(i)$, respectively $CF_V(i)$, and the current reference correction factor $CF_U$, respectively $CF_V$.

According to an embodiment, the correction coefficients $CF_U$, respectively $CF_V$, is obtained for neighbors of a current pixel i of a chroma component, and the correction factor $CF_U$, respectively $CF_V$, for said current pixel is then obtained by filtering said correction factors.

For example, the correction factor $CF_U$, respectively $CF_V$, for a current pixel is the average of the correction factor $CF_U$, respectively $CF_V$, computed for the neighbors.

According to an embodiment of said variant, spatial neighbors are considered and according to another embodiment, temporal neighbors are considered.

In a variant, both spatial and temporal neighbors may also be considered.

According to an embodiment, a histogram of different values of the correction factor $CF_U$, respectively $CF_V$, computed for pixels of the component $C_{12}^2$, respectively $C_{12}^3$, is computed.

Using a histogram allows to detect some high values of a correction factor that may appear erratically due to noise present in a component. In that case there is no need to apply the corresponding high values of said correction factor on all the pixels. A consistent value of said correction factor can be estimated by forcing a fixed minimum count of values of said correction factor by counting the number of bins present in the histogram, starting from the highest bins.

According to an embodiment, a single correction coefficient CF is used. For example, CF equals the maximum or the average of the correction factor $CF_U$ and the correction factor $CF_V$.

Optionally, in step 203, the component $C_{1,pre}^1$ may be adjusted to further control the perceived saturation, as follows:

$$C_{12}^1 = C_{1,pre}^1 - \max(0, a \cdot C_{12}^2 + b \cdot C_{12}^3) \quad (3)$$

where a and b are two parameters.

This step 203 allows control of the luminance (represented by the component $C_{12}^1$) to allow a perceived color matching between the colors (saturation and hue) obtained from the three components $\{C_{12}^m\}$ and the colors of the input image.

The set of parameters SP may include information data related to the mapping function or its inverse (steps 200, 202 and 282), information data related to the chroma correcting (steps 201, 204 and 281), information related to at least one correction factor ($CF_U$, $CF_V$ or CF), information data related to the saturation adjusting function, in particular their parameters a and b (step 203), and/or information related to the optional conversion used in the format adapting stages 21, 22, 27, 29 (for example gamut mapping and/or inverse gamut mapping parameters).

According to an embodiment, said information data related to at least one correction factor ($CF_U$, $CF_V$ or CF) may define said at least one correction factor ($CF_U$, $CF_V$ or CF) and coefficients of an inverse of a theoretical color space conversion matrix $A^{-1}$.

The inverse of a theoretical color space conversion matrix $A^{-1}$ may be given by:

$$A^{-1} = \begin{bmatrix} 1 & 0 & m_0 \\ 1 & m_1 & m_2 \\ 1 & m_3 & 0 \end{bmatrix}$$

where $m_i$ i=0, 1, 2, 3 are usually denoted theoretical coefficients of the matrix $A^{-1}$.

For example, the matrix $A^{-1}$ may be the inverse of the canonical 3×3 RGB-to-YUV conversion matrix A as specified in ITU-R Rec. BT.2020. The matrix $A = [A_1 A_2 A_3]^T$ may be a canonical 3×3 RGB-to-YUV conversion matrix, $A_1 A_2 A_3$ being 1×3 matrices. The matrix $A^{-1}$ is then given by:

$$A^{-1} = \begin{bmatrix} 1 & 0 & 1.4746 \\ 1 & -0.16455 & -0.57135 \\ 1 & 1.8814 & 0 \end{bmatrix}$$

When specified in ITU-R Rec. BT.709, the matrix $A^{-1}$ is given by:

$$A^{-1} = \begin{bmatrix} 1 & 0 & 1.5748 \\ 1 & -0.18733 & -0.46813 \\ 1 & 1.85563 & 0 \end{bmatrix}$$

According to said embodiment, in step 23, the correction factors $CF_U$ and $CF_V$, or a single correction coefficient CF, and coefficients of the matrix $A^{-1}$ may be conveyed by metadata.

According to an embodiment, information data related to at least one correction factor ($CF_U$, $CF_V$ or CF) may define coefficients of a corrected matrix $Ac^{-1}$.

The corrected matrix $Ac^{-1}$ is a corrected version of the matrix $A^{-1}$ that is the theoretical coefficients of the matrix $A^{-1}$ are corrected according to at least one correction factor $CF_U$, $CF_V$ or by a single correction factor CF.

According to a variant of said embodiment of step 23, the corrected matrix $Ac^{-1}$ may be given by:

$$Ac^{-1} = \begin{bmatrix} 1 & 0 & m_0/CFv \\ 1 & m_1/CFu & m_2/CFv \\ 1 & m_3/CFu & 0 \end{bmatrix} = \begin{bmatrix} 1 & 0 & m'_0 \\ 1 & m'_1 & m'_2 \\ 1 & m'_3 & 0 \end{bmatrix}$$

where $m'_i$ are coefficients of the matrix $Ac^{-1}$ obtained by dividing the theoretical coefficients $m_i$ of the matrix $A^{-1}$ by a correction factor $CF_U$ or $CF_V$.

According to a variant of an embodiment of step 23, the corrected matrix $Ac^{-1}$ is then given by:

$$Ac^{-1} = \begin{bmatrix} 1 & 0 & m_0/CF \\ 1 & m_1/CF & m_2/CF \\ 1 & m_3/CF & 0 \end{bmatrix} = \begin{bmatrix} 1 & 0 & m'_0 \\ 1 & m'_1 & m'_2 \\ 1 & m'_3 & 0 \end{bmatrix}$$

where $m'_i$ are coefficients of the matrix $Ac^{-1}$ obtained by dividing the theoretical coefficients m of the matrix $A^{-1}$ by a correction factor CF.

According to said embodiment, in step 23, the correction factors $CF_U$ and $CF_V$ or a single correction coefficient CF may be conveyed by metadata used to conveyed coefficients of the corrected matrix $Ac^{-1}$ (Clause 6.3.2.6 and Annex A.2.3.2.6 of technical specification ETSI TS 103 433-1 V1.2.1).

Then in step 23, metadata used to convey either the correction factors $CF_U$ and $CF_V$, or a single correction coefficient CF, and coefficients of the matrix $A^{-1}$ or coefficients of the corrected matrix $Ac^{-1}$ are generated and added to the bitstream B.

Note that other metadata required by the decoder may also be conveyed by the bitstream B or any other bitstream such as metadata relative to the definition of the color primaries and/or color gamut.

The set of parameters SP may also include the information data ID and information characteristics of the output image, for example the format of the three components $\{C_{30}^{m}\}$ representative of the output image (steps 29, 284 of FIG. 2).

In more details, the post-processing step 28 includes steps 280-282 which take as input at least one parameter of the set of parameters SP.

In optional step 280, the component $C_2^1$ of the three components $\{C_2^m\}$, output of step 27, may be adjusted as follows:

$$C_{2,post}^1 = C_2^1 + \max(0, a \cdot C_2^2 + b \cdot C_2^3) \tag{4}$$

where a and b are two parameters of the set of parameters SP.

For example, the step 280 is executed when the information data ID indicates that SL-HDR1 has to be considered and not executed when it indicates that SL-HDR2 has to be considered.

In step 282, the component $C_{3,post}^1$ of the three components $\{C_3^3\}$ is obtained by applying a mapping function on the component $C_2^1$ $$C_{3,post}^1 = MF1(C_2^1) \tag{5}$$

or, optionally, $$C_{3,post}^1 = MF1(C_{2,post}^1) \tag{5b}$$

where MF1 is a mapping function derived from at least one parameter of the set of parameters SP.

In step 281, the components $C_3^2$, $C_3^3$ of the three components $\{C_m^3\}$ may be derived by multiplying the components $C_2^2$, $C_2^2$ of the three components $\{C_2^m\}$ by at least one corrected chroma correction (scaling) function depending on the component $C_2^1$ or, optionally, $C_{2,post}^1$.

According to an embodiment, a chroma correcting function $\beta(.)$ is implemented as a 1D Look-Up-Table lutCC as defined, for example, by Clause 7.2.3.2 of the technical specification ETSI TS 103 433-1 V.1.2.1, August 2017.

According to an embodiment, said at least one corrected chroma correction function may be derived by multiplying the chroma correction function $\beta(.)$ by at least one correction factor $CF_U$, $CF_V$ or CF.

According to an embodiment, in step 281, a corrected chroma correction function $\beta cu(.)$ is obtained by multiplying the chroma correction function $\beta(.)$ by the correction factor $CF_U$ and a corrected chroma correcting function $\beta cv(.)$ is obtained by multiplying the chroma correcting function $\beta(.)$ by the correction factor $CF_V$. The component $C_2^3$ is then derived from the corrected chroma correction function $\beta cu(.)$, and the components $C_3^3$ is then derived from the corrected chroma correction function $\beta cv(.)$.

Mathematically speaking, the components $C_{3,post}^2$, $C_{3,post}^3$ are given by:

$$\begin{bmatrix} C_{3,post}^2 \\ C_{3,post}^3 \end{bmatrix} = \begin{bmatrix} \beta cu(C_2^1) \\ \beta cv(C_2^1) \end{bmatrix} \begin{bmatrix} C_2^2 \\ C_2^3 \end{bmatrix} \tag{6a}$$

or optionally, $$\begin{bmatrix} C_{3,post}^2 \\ C_{3,post}^3 \end{bmatrix} = \begin{bmatrix} \beta cu(C_{2,post}^1) \\ \beta cv(C_{2,post}^1) \end{bmatrix} \begin{bmatrix} C_2^2 \\ C_2^3 \end{bmatrix} \tag{6b}$$

The corrected chroma correction functions $\beta cu(.)$, $\beta cv(.)$ allow to control independently the chroma components of an image formed by the components $\{C_3^m\}$ and guarantees their matching to the colors of the image formed by the components $\{C_{10}^m\}$.

According to an embodiment, in step 281, a single corrected chroma correction function $\beta c(.)$ is obtained by multiplying the chroma correction function $\beta(.)$ by the single correction factor CF.

The components $C_{3,post}^2$ and $C_{3,post}^3$ are then derived from the corrected chroma correction function $\beta c(.)$.

Mathematically speaking, the components $C_3^2$, $C_3^3$ are given by:

$$\begin{bmatrix} C_{3,post}^2 \\ C_{3,post}^3 \end{bmatrix} = \beta c(C_2^1) \begin{bmatrix} C_2^2 \\ C_2^3 \end{bmatrix} \quad (6c)$$

or optionally, $$\begin{bmatrix} C_{3,post}^2 \\ C_{3,post}^3 \end{bmatrix} = \beta c(C_{2,post}^1) \begin{bmatrix} C_2^2 \\ C_2^3 \end{bmatrix} \quad (6d)$$

The corrected chroma correction function $\beta c(.)$ allows to control the colors of an image formed by the components $\{C_3^m\}$ and guarantees their matching to the colors of the image formed by the components $\{C_{10}^m\}$.

In step 283, three components denoted $(R_1, G_1, B_1)$ are obtained from components $C_{3,post}^2$ and $C_{3,post}^3$, outputs of the step 281, by taking into account parameters of the set of parameters SP:

$$\begin{bmatrix} R_1 \\ G_1 \\ B_1 \end{bmatrix} = \begin{bmatrix} 1 & 0 & m_0' \\ 1 & m_1' & m_2' \\ 1 & m_3' & 0 \end{bmatrix} \times \begin{bmatrix} S_0 \\ C_{3,post}^2 \\ C_{3,post}^3 \end{bmatrix}$$

where $m_i'$, $i=0, 1, 2, 3$ are the coefficients of the corrected matrix $Ac^{-1}$ obtained from an information data carried as metadata in bitstream B and $S_0$ is derived from the components $C_{3,post}^2$ and $C_{3,post}^3$ and other parameters of the set of parameters SP also carried as metadata in bitstream B.

Using the corrected matrix $Ac^{-1}$ compensates the correction applies on the chroma correction function $\beta(.)$.

According to an embodiment, the coefficients $m_i'$ of the corrected matrix $Ac^{-1}$ are obtained from an information data defining at least one correction factor $CF_U$, $CF_V$ or CF and coefficients of an inverse of a theoretical color space conversion matrix $A^{-1}$.

According to a variant of said embodiment, the corrected matrix $Ac^{-1}$ may be given by:

$$Ac^{-1} = \begin{bmatrix} 1 & 0 & m_0/CFv \\ 1 & m_1/CFu & m_2/CFv \\ 1 & m_3/CFu & 0 \end{bmatrix} = \begin{bmatrix} 1 & 0 & m_0' \\ 1 & m_1' & m_2' \\ 1 & m_3' & 0 \end{bmatrix}$$

where $m_i'$ are coefficients of the matrix $Ac^{-1}$ obtained by dividing the theoretical coefficients $m_i$ of the matrix $A^{-1}$ by a correction factor $CF_U$ or $CF_V$.

According to a variant of an embodiment, the corrected matrix $Ac^{-1}$ is then given by:

$$Ac^{-1} = \begin{bmatrix} 1 & 0 & m_0/CF \\ 1 & m_1/CF & m_2/CF \\ 1 & m_3/CF & 0 \end{bmatrix} = \begin{bmatrix} 1 & 0 & m_0' \\ 1 & m_1' & m_2' \\ 1 & m_3' & 0 \end{bmatrix}$$

where $m_i'$ are coefficients of the matrix $Ac^{-1}$ obtained by dividing the theoretical coefficients $m$ of the matrix $A^{-1}$ by a correction factor CF.

According to an embodiment, the coefficients of the corrected matrix $Ac^{-1}$ are obtained from information data defining said coefficients of a corrected matrix $Ac^{-1}$.

In step 284, the three components $\{C_3^m\}$ are then obtained by scaling the three components $(R_1, G_1, B_1)$ according to the component $C_{3,post}^1$, output of step 282.

$$\begin{cases} C_3^1 = C_{3,post}^1 \times R_1 \\ C_3^2 = C_{3,post}^1 \times G_1 \\ C_3^3 = C_{3,post}^1 \times B_1 \end{cases} \quad (7)$$

According to a first embodiment of the end-to-end workflow of FIG. 2, the information data ID indicates that SL-HDR1 has to be considered.

The mapping function MF(.) in eq. (1) reduces the dynamic range of the luminance of the input image, its inverse IMF(.) in eq. (2) increases the dynamic range of the component $C_{1,pre}^1$, and the mapping function MF1(.) in eq.(5) increases the dynamic range of the component $C_{2,post}^1$.

According to a first variant of the first embodiment, the component $C_1^1$ is a non-linear signal, denoted luma in literature, which is obtained (step 21) from the gamma-compressed RGB components of the input image by:

$$C_1^1 = A_1 \begin{bmatrix} R^{1/\gamma} \\ G^{1/\gamma} \\ B^{1/\gamma} \end{bmatrix} \quad (8)$$

where $\gamma$ may be a gamma factor, equal to 2.4 in some implementations.

According to the first variant, the component $C_1^2$, $C_1^3$ are obtained (step 21), by applying a gamma compression to the RGB components of the input image:

$$\begin{bmatrix} C_1^2 \\ C_1^3 \end{bmatrix} = \begin{bmatrix} A_2 \\ A_3 \end{bmatrix} \begin{bmatrix} R^{1/\gamma} \\ G^{1/\gamma} \\ B^{1/\gamma} \end{bmatrix} \quad (9)$$

In step 201, according to the first variant, the components $C_1^2$ and $C_1^3$ are corrected from the ratio between the component $C_{1,pre}^1$ over the product of the gamma-compressed reconstructed component $\hat{c}_1^{\bar{1}}$ by $\Omega(C_{1,pre}^1)$:

$$\begin{bmatrix} C_{12}^2 \\ C_{12}^3 \end{bmatrix} = \frac{C_{1,pre}^1}{\Omega(C_{1,pre}^1) \cdot \hat{C}_1^{\bar{1}^{1/\gamma}}} \cdot \begin{bmatrix} C_1^2 \\ C_1^3 \end{bmatrix} \quad (10)$$

where $\Omega(C_{1,pre}^1)$ is a value that depends on the component $C_{1,pre}^1$ but may also be a constant value depending on the color primaries of the three components $\{C_1^m\}$. $\Omega(C_{1,pre}^1)$ may equal to 1.2 for Rec. BT.2020 for example. Possibly, $\Omega(C_{1,pre}^1)$ may also depend on parameters as specified in ETSI TS 103 433-1 V.1.2.1 clauses C.1.2 and C.2.3. $\Omega(C_{1,pre}^1)$ may also be a parameter of the set of parameters SP.

Further, according to the first variant, the three components $\{C_{120}^m\}$ may represent a Y'CbCr 4:2:0 gamma transfer characteristics video signal.

For example, the control parameters relative to the mapping function MF and/or its inverse IMF and/or the mapping function MF1(.) may be determined as specified in Clause C.3.2 (ETSI technical specification TS 103 433-1 V1.2.1). The chroma correcting function β(.) and their parameters may be determined as specified in Clause C.2.3 and C.3.4 (ETSI technical specification TS 103 433-1 V1.2.1). Information data related to the control parameters, information data related to the mapping functions or their inverse, and information data related to the chroma correcting function β(.) and their parameters, information data related to the correction factors $CF_U$ and $CF_V$ or a single correction coefficient CF, are parameters of the set of parameters SP. Examples of numerical values of the parameters of the set of parameters SP may be found, for example, in Annex F (Table F.1 of ETSI technical specification TS 103 433-1 V1.2.1).

The coefficients $m_i$ of the matrix $A^{-1}$ and $S_0$ may be determined as specified in Clause 6.3.2.6 (matrixCoefficient [i]) and Clause 6.3.2.8 (kCoefficient[i] are used to construct $S_0$) of ETSI technical specification TS 103 433-1 V1.2.1 and their use for reconstruction may be determined as specified in Clause 7.2.4 (ETSI technical specification TS 103 433-1 V1.2.1).

According to a second variant of the first embodiment, the component $C_1^1$ is a linear-light luminance component L obtained from the RGB component of the input image $I_1$ by:

$$C_1^1 = L = A_1 \begin{bmatrix} R \\ G \\ B \end{bmatrix} \quad (11)$$

According to the second variant, the component $C_1^2, C_1^3$ are derived (step 21) by applying a gamma compression to the RGB components of the input image $I_1$:

$$\begin{bmatrix} C_1^2 \\ C_1^3 \end{bmatrix} = \begin{bmatrix} A_2 \\ A_3 \end{bmatrix} \begin{bmatrix} R^{1/\gamma} \\ G^{1/\gamma} \\ B^{1/\gamma} \end{bmatrix} \quad (12)$$

According to the second variant, the component $C_{12}^2, C_{12}^3$ are derived (step 201) by correcting the components $C_1^2, C_1^3$ from the ratio between the first component $C_{1,pre}^1$ over the product of the gamma-compressed reconstructed component $\hat{c}_1^1$ by $\Omega(C_{1,pre}^1)$.

$$\begin{bmatrix} C_{12}^2 \\ C_{12}^3 \end{bmatrix} = \frac{C_{1,pre}^1}{\Omega(C_{1,pre}^1) \cdot \hat{c}_1^{1/\gamma}} \begin{bmatrix} C_1^2 \\ C_1^3 \end{bmatrix} \quad (13)$$

where $\Omega(C_{1,pre}^1)$ is a value that depends on the component $C_{1,pre}^1$ and, is possibly, obtained from parameters as specified in ETSI TS 103 433-1 V.1.2.1 clauses C.1.2 and C.3.4.2 where $$\Omega(C_{1,pre}^1) = \frac{1}{\text{Max}(R_{sgf}:255; R_{sgf} \cdot g(Y_n))}$$

in equation (22).

$\Omega(C_{1,pre}^1)$ may also be a parameter of the set of parameters SP.

Further, according to the second variant, the three components $\{C_{120}^m\}$ may represent a Y'CbCr 4:2:0 gamma transfer characteristics video signal.

For example, the control parameters related to the mapping function MF and/or its inverse IMF and/or the mapping function MF1(.) may be determined as specified in Clause C.3.2 (ETSI technical specification TS 103 433-1 V1.2.1). The chroma correcting function (.) and their parameters may be determined as specified in Clause 7.2.3.2 (ETSI technical specification TS 103 433-2 V.0.0.4) eq. (25) where $f_{sgf}(Y_n)=1$. Information data related to the control parameters, information related to the correction factors $CF_U, CF_V$ or CF, information data related to the mapping functions or their inverse, and information data related to the chroma correcting function β(.) and their parameters, are parameters of the set of parameters SP.

The coefficients $m_i$ of the matrix $A^{-1}$ and $S_0$ may be determined as specified in Clause 6.3.2.6 (matrixCoefficient [i]) and Clause 6.3.2.8 (kCoefficient[i] are used to construct $S_0$) of ETSI technical specification TS 103 433-1 V1.2.1. Use of the parameters for reconstruction may be determined as specified in Clause 7.2.4 (ETSI technical specification TS 103 433-1 V1.2.1).

According to a second embodiment of the end-to-end workflow of FIG. 2, the information data ID indicates that SL-HDR2 has to be considered.

In the second embodiment, the three components $\{C_1^m\}$ may be represented as a Y'CbCr4:4:4 full range PQ10 (PQ 10 bits) video signal (specified in Rec. ITU-R BT.2100). The three components $\{C_{20}^m\}$, which represent PQ 10-bit image data and associated parameter(s) computed from the three components $\{C_1^m\}$ (typically 10, 12 or 16 bits), are provided. The provided components are encoded (step 23) using, for example an HEVC Main 10 profile encoding scheme. Those parameters are set to the set of parameters SP.

The mapping function MF1(.) in eq.(5) may increase or reduce the dynamic range of the component $C_{2,post}^1$ according to variants.

For example, the mapping function MF1(.) increases the dynamic range when the peak luminance of the connected HDR CE displays is above the peak luminance of the content. The mapping function MF1(.) decreases the dynamic range when the peak luminance of the connected HDR or SDR CE displays is below the peak luminance of the content. For example, the peak luminances may be parameters of the set of parameters SP.

For example, the control parameters related to the mapping function ME may be determined as specified in Clause C.3.2 (ETSI technical specification TS 103 433-1 V1.2.1). The chroma correcting function β(.) and their parameters may be determined as specified in Clause 7.2.3.2 (ETSI technical specification TS 103 433-2 V.0.0.4) eq. (25) where $f_{sgf}(Y_n)=1$. Information data related to the control parameters, information data related to the mapping function, and information data related to the chroma correcting function β(.) and their parameters, information related to the correction factors $CF_U$ and $CF_V$ or a single correction coefficient CF, are parameters of the set of parameters SP. Examples of numerical values of the parameters of the set of parameters SP may be found, for example, in Annex F (Table F.1) (ETSI technical specification TS 103 433-2 V.0.0.4).

The coefficients $m_i$ of the matrix $A^{-1}$ (defined by matrix Coefficient[i] in ETSI technical specification TS 103 433-2 V.0.0.4) and $S_0$ (constructed with kCoefficient[i] in ETSI technical specification TS 103 433-2 V.0.0.4) may be determined as specified in Clause 7.2.4 (ETSI technical specification TS 103 433-2 V.0.0.4).

According to a first variant of the second embodiment, the three components $\{C_{30}{}^m\}$ representative of the output image are the three components $\{\tilde{c}_{20}^m\}$.

According to a second variant of the second embodiment, in the post-processing step 28, the three components $\{C_3{}^m\}$ are reconstructed from the three components $\{\tilde{c}_{20}^m\}$ and parameters of the set of parameters SP after decoding (step 25).

The three components $\{C_3{}^m\}$ are available for either an SDR or HDR enabled CE display. The format of the three components $\{C_3{}^m\}$ are possibly adapted (step 29) as explained above.

The mapping function MF(.) or MF1(.) is based on a perceptual transfer function. The goal of the perceptual transfer function is to convert a component of an input image into a component of an output image, thus reducing (or increasing) the dynamic range of the values of their luminance. The values of a component of the output image belong thus to a lower (or greater) dynamic range than the values of the component of an input image. The perceptual transfer function uses a limited set of control parameters.

Figure 3:
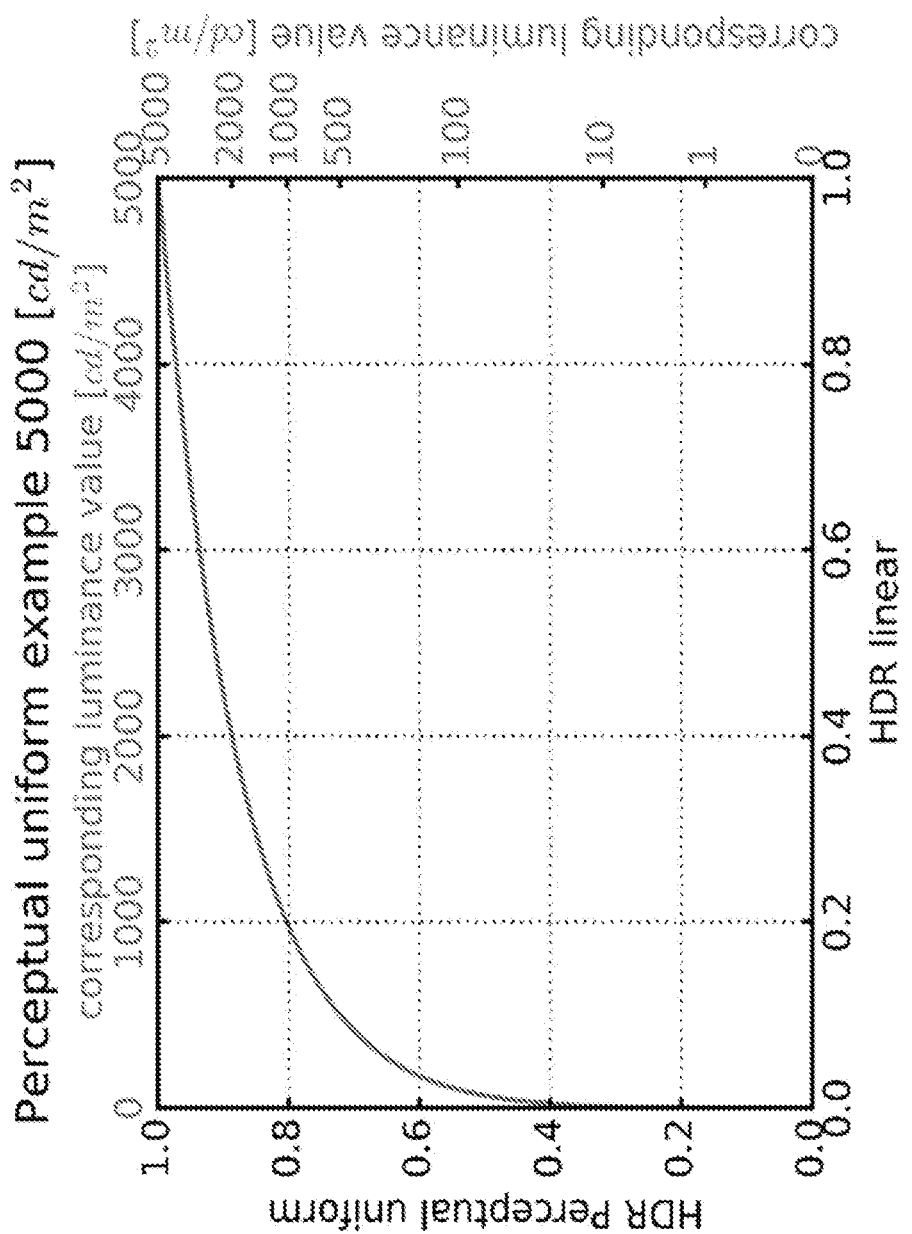
FIG. 3 shows an illustration of an example of perceptual transfer function.
Figure 4:
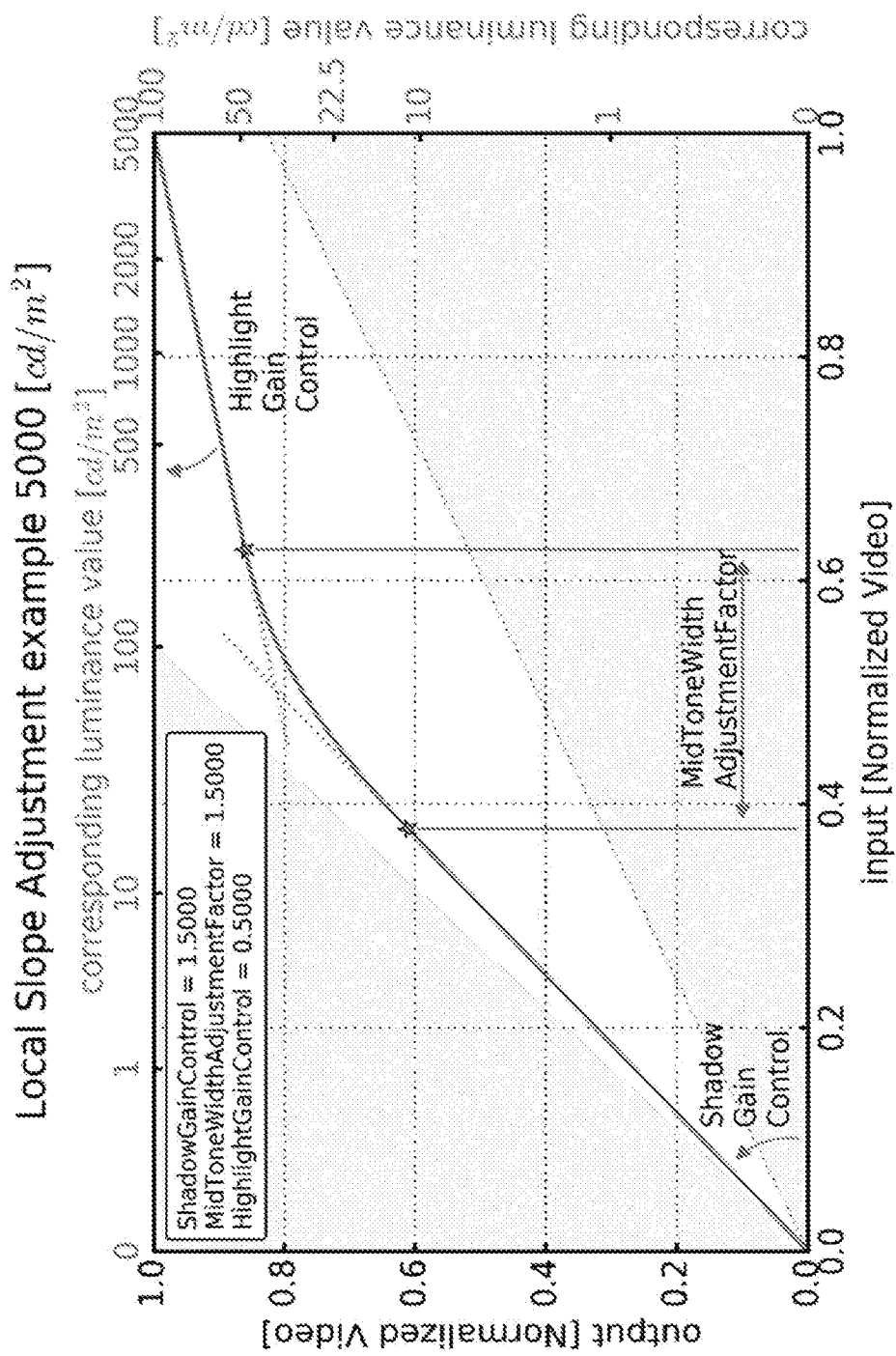
FIG. 4 shows an example of a piece-wise curve used for mapping.

FIG. 3 shows an illustration of an example of a perceptual transfer function that may be used for mapping luminance components but a similar perceptual transfer function for mapping the luminance component may be used. The mapping is controlled by a mastering display peak luminance parameter (equal to 5000 cd/m² in FIG. 3). To better control the black and white levels, a signal stretching between content-dependent black and white levels is applied. Then the converted signal is mapped using a piece-wise curve constructed out of three parts, as illustrated in FIG. 4. The lower and upper sections are linear, the steepness is determined by the shadowGain control and highlightGain control parameters respectively. The mid-section is a parabola providing a continuous and smooth bridge between the two linear sections. The width of the cross-over is determined by the midToneWidthAdjFactor parameter. All the parameters controlling the mapping may be conveyed as metadata for example by using an SEI message as specified in ETSI TS 103 433-1 Annex A.2 metadata.

Figure 4A:
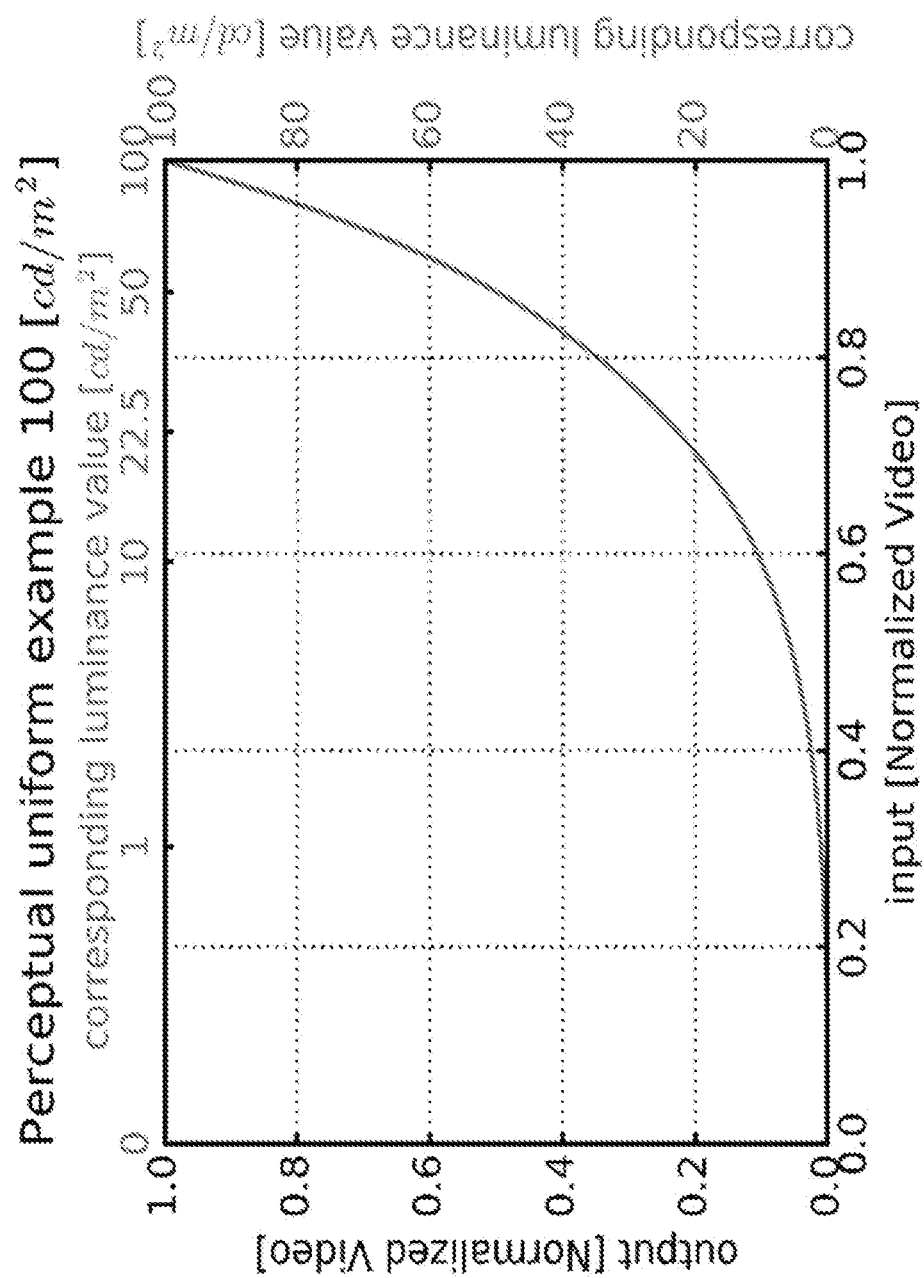
FIG. 4a shows an example of a curve used for converting a perceptual uniform signal to a linear-light domain.

FIG. 4a shows an example of the inverse of the perceptual transfer function TM (FIG. 3) to illustrate how a perceptually optimized luminance signal may be converted back to the linear-light domain based on a targeted legacy display maximum luminance, for example 100 cd/m².

In step 25 (FIG. 2), the set of parameters SP is obtained to reconstruct the three components $\{C_3{}^m\}$ from the three components $\{\tilde{c}_{20}^m\}$. These parameters may be obtained from metadata obtained from a bitstream, for example the bitstream B.

ETSI TS 103 433-1 V1.2.1 clause 6 and Annex A.2 provide an example of syntax of the metadata. The syntax of this ETSI recommendation is described for reconstructing an HDR video from an SDR video but this syntax may extend to the reconstruction of any image from any decoded components. As an example, TS 103 433-2 V.0.0.4 uses the same syntax for reconstructing a display adapted HDR video from an HDR video signal (with a different dynamic range).

According to ETSI TS 103 433-1 V1.2.1, the dynamic metadata may be conveyed according to either a so-called parameter-based mode or a table-based mode. The parameter-based mode may be of interest for distribution workflows that have a goal of, for example, providing direct SDR backward compatible services with very low additional payload or bandwidth usage for carrying the dynamic metadata. The table-based mode may be of interest for workflows equipped with low-end terminals or when a higher level of adaptation is required for representing properly both HDR and SDR streams. In the parameter-based mode, dynamic metadata to be conveyed include luminance mapping parameters representative of the inverse mapping function to be applied at the post-processing step, that is tmInputSignalBlackLevelOffset; tmInputSignaWhiteLeveOffset; shadowGain; highlightGain; midToneWidthAdjFactor; tmOutputFine Tuning parameters.

Moreover, other dynamic metadata to be conveyed include color correction parameters (saturationGainNumVal, saturationGainX(i) and saturationGainY(i)) used to fine-tune the default chroma correcting function β(.) as specified in ETSI TS 103 433-1 V1.2.1 clauses 6.3.5 and 6.3.6. The parameters a and b may be respectively carried in the saturationGain function parameters as explained above. These dynamic metadata may be conveyed using, for example, the HEVC SL-HDR Information (SL-HDRI) user data registered SEI message (see ETSI TS 103 433-1 V1.2.1 Annex A.2) or another extension data mechanism such as specified in the AVS2/IEEE1857.4 specification. Typical dynamic metadata payload size is less than 100 bytes per picture or scene.

Back to FIG. 2, in step 25, the SL-HDRI SEI message is parsed to obtain at least one parameter of the set of parameters SP.

In step 282 and 202, the inverse mapping function (so-called lutMapY) is reconstructed (or derived) from the obtained mapping parameters (see ETSI TS 103 433-1 V1.2.1 clause 7.2.3.1 for more details; same clause for TS 103 433-2 V.0.0.4).

In step 282 and 202, the chroma correcting function β(.) (so-called lutCC) is also reconstructed (or derived) from the obtained color correction parameters (see ETSI TS 103 433-1 V1.2.1 clause 7.2.3.2 for more details; same clause for TS 103 433-2 V.0.0.4).

In the table-based mode, dynamic data to be conveyed include pivots points of a piece-wise linear curve representative of the mapping function. For example, the dynamic metadata are luminanceMappingNumVal that indicates the number of the pivot points, luminanceMappingX that indicates the abscissa (x) values of the pivot points, and luminanceMappingY that indicates the ordinate (y) values of the pivot points (see ETSI TS 103 433-1 V1.2.1 clauses 6.2.7 and 6.3.7 for more details). Moreover, other dynamic metadata to be conveyed may include pivots points of a piece-wise linear curve representative of the chroma correcting function β(.). For example, the dynamic metadata are colorCorrectionNumVal that indicates the number of pivot points, colorCorrectionX that indicates the x values of pivot points, and colorCorrectionY that indicates the y values of the pivot points (see ETSI TS 103 433-1 V1.2.1 clauses 6.2.8 and 6.3.8 for more details). These dynamic metadata may be conveyed using, for example, the HEVC SL-HDRI SEI message (mapping between clause 6 parameters and annex A distribution metadata is provided in Annex A.2.3 of ETSI TS 103 433-1 V1.2.1).

In step 25, the SL-HDRI SEI message is parsed to obtain the pivot points of a piece-wise linear curve representative of the inverse mapping function and the pivot points of a piece-wise linear curve representative of the chroma correcting function β(.), and the chroma to luma injection parameters a and b.

In step 282 and 202, the inverse mapping function is derived from those pivot points relative to a piece-wise linear curve representative of the inverse mapping function ITM (see ETSI TS 103 433-1 V1.2.1 clause 7.2.3.3 for more details; same clause for ETSI TS 103 433-2 V.0.0.4).

In step 281 and 201, the chroma correcting function β(.), is also derived from those of the pivot points relative to a piece-wise linear curve representative of the chroma correcting function β(.) (see ETSI TS 103 433-1 V1.2.1 clause 7.2.3.4 for more details, same clause for TS 103 433-2 V.0.0.4).

Note that static metadata also used by the post-processing step may be conveyed by SEI message. For example, the selection of either the parameter-based mode or table-based mode may be carried by the payloadMode information as specified by ETSI TS 103 433-1 V1.2.1 (clause A.2.2). Static metadata such as, for example, the color primaries or the maximum mastering display luminance are conveyed by a Mastering Display Colour Volume (MDCV) SEI message as specified in AVC, HEVC or embedded within the SL-HDRI SEI message as specified in ETSI TS 103 433-1 V1.2.1 Annex A.2.

According to an embodiment of step 25, the information data ID is explicitly signaled by a syntax element in a bitstream and thus obtained by parsing the bitstream. For example, the syntax element is a part of an SEI message such as sl_hdr_mode_value_minus1 syntax element contained in an SL-HDRI SEI message.

According to an embodiment, the information data ID identifies the processing that is to be applied to the input image to process the set of parameters SP. According to this embodiment, the information data ID may then be used to deduce how to use the parameters to reconstruct the three components $\{C_3^m\}$ (step 25).

For example, when equal to 1, the information data ID indicates that the set of parameters SP has been obtained by applying the SL-HDR1 pre-processing step (step 20) to an input HDR image, and that the three components $\{\tilde{c}_{20}^m\}$ are representative of an SDR image. When equal to 2, the information data ID indicates that the parameters have been obtained by applying the SL-HDR2 pre-processing step (step 20) to an HDR 10 bits image (input of step 20), and that the three components $\{\tilde{c}_{20}^m\}$ are representative of an HDR10 image.

According to an embodiment of set 25, when the coefficients of the corrected matrix $Ac^{-1}$ are obtained from information data conveyed by metadata, at least one correction factor is obtained from said corrected matrix $Ac^{-1}$ obtained by parsing received metadata.

According to an embodiment of step 25, the correction factors $CF_U$ is the average of the ratio of the coefficient $m_1/CFu$ of the matrix $Ac^{-1}$ over its theoretical value $m_1$ and the ratio of the coefficient $m_3/CFu$ over its theoretical value $m_3$ and the correction factors $CF_V$ is the average of the ratio of the coefficient $m_0/CF_V$ over its theoretical value $m_0$ and the ratio of the coefficient $m_2/CFv$ over its theoretical value $m_2$.

According to an embodiment, the correction factor $CF_U$ is the ratio of the highest coefficient between $m_1/CFu$ and $$\frac{m_3}{CFu}$$

over its theoretical value and the correction factors $CF_V$ is the ratio of the highest coefficient between $m_0/CFv$ and $m_2/CFv$ over its theoretical value.

According to an embodiment, the correction factor CF is the average of the ratio of the coefficient $m_1/CFu$ over its theoretical value $m_1$, the ratio of the coefficient $m_3/CFu$ over its theoretical value $m_3$, the ratio of the coefficient $m_0/CFv$ over its theoretical value $A_{13}$ and the ratio of the coefficient $m_2/CFv$ over its theoretical $m_2$.

According to an embodiment, the correction factor CF is the ratio of the highest coefficient between $m/CF$, $m_3/CF$, $m_0/CF$ and $m_2/CF$ over its theoretical value.

If no temporal stabilization is applied, the correction factors $CF_U$ and $CF_V$ (or CF) may fluctuate, and this may make the HDR data reconstructed by the postprocessor be visually unstable or that may be incorrect because of clipping or non-optimal precision.

If a temporal stabilization based on a scene-cut detection, that is the correction factors $CF_U$ and $CF_V$ (or the correction factor CF) are allowed to be modified only when a scene-cut is detected, the process cannot adapt to slight changes in the content that are below the scene-cut detector threshold and thus this can produce correction factors $CF_U$ and $CF_V$ (or the correction factor CF) that are not adapted to the current image and that produce HDR data that are badly reconstructed because of clipping or non-optimal precision. In other words, this makes the process inefficient inside a scene-cut.

According to an embodiment, the values of each of the correction factor $CF_U$ and $CF_V$ (or the correction factor CF) are collected over a pre-determined period of time preceding the current time, and at the current time a filtered version of each of these correction factors is delivered.

Figure 6:
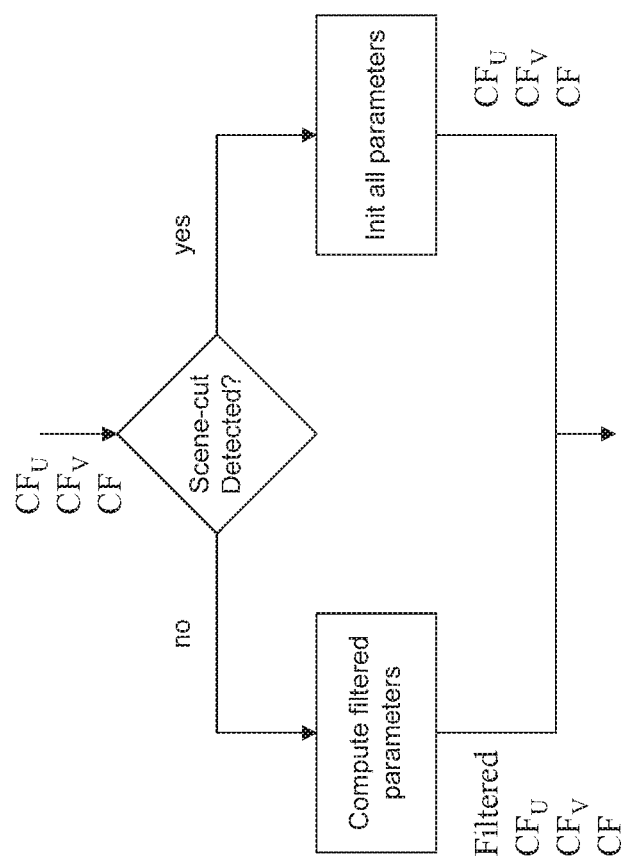
FIG. 6 shows a block diagram of a method for collecting the values of each of the correction factor over a pre-determined period of time in according with a first embodiment.

FIG. 6 shows a block diagram of a method for collecting the values of each of the correction factor over a pre-determined period of time in according with a first embodiment.

Whenever a scene-cut has been detected by the system, a configurable buffer is initialized for each correction factor as follows:

For example, the buffer $CF_U\_buf[.]$ and $CF_V\_buf[.]$ are initialized when two corrector factors are used or a single buffer is initialized $CF\_buf[.]$ when a single correction factor is used. The buffer size n (or length) represents the number of successive frames that are analyzed to compute the filtered versions of the correction factors.

When two correction factors are used, the buffer size n can be the same for the two correction factors or can be different depending of the correction factor values.

Each value of each buffer is initialized with an incoming value of the correction factor $CF_U$, $CF_V$, or CF:

$CF_U\_buf[0]=CF_U$, $CF_U\_buf[1]=CF_U$, ..., $CF_U\_buf[n-1]=CF_U$ $CF_V\_buf[0]=CF_V$, $CF_V\_buf[1]=CF_V$, ..., $CF_V\_buf[n-1]=CF_V$ $CF\_buf[0]=CF$, $CF\_buf[1]=CF$, ..., $CF\_buf[n-1]=CF$ For each correction factor, a cumulated value representative to all the values of the corresponding buffer is computed: cum_value=f(all values of the buffer). The function f(.) can be a simple sum, a weighted sum that gives more weight to a specific position in the buffer:

cum_$CF_U$=f($CF_U$_buf[i], i=0 . . . n-1)
cum_$CF_V$=f($CF_V$_buf[i], i=0 . . . n-1)

As an example, if the buffer size n is the same for the two correction factors and if the cumulated value is a simple sum for the two correction factors, the cumulated values are:

cum_$CF_U$=$CF_U$*n
cum_$CF_V$=$CF_V$*n
cum_CF=CF*n

An index representative to the current frame position in the buffer is initialized:

If the two buffer sizes are the same, a single index is initialized: indexfilterIndex=0

If the two buffer sizes are different, each buffer size needs to be indexed by a specific index and each specific index is initialized to 0 (indexFilterU=0, indexFilterV=0)

Figure 7:
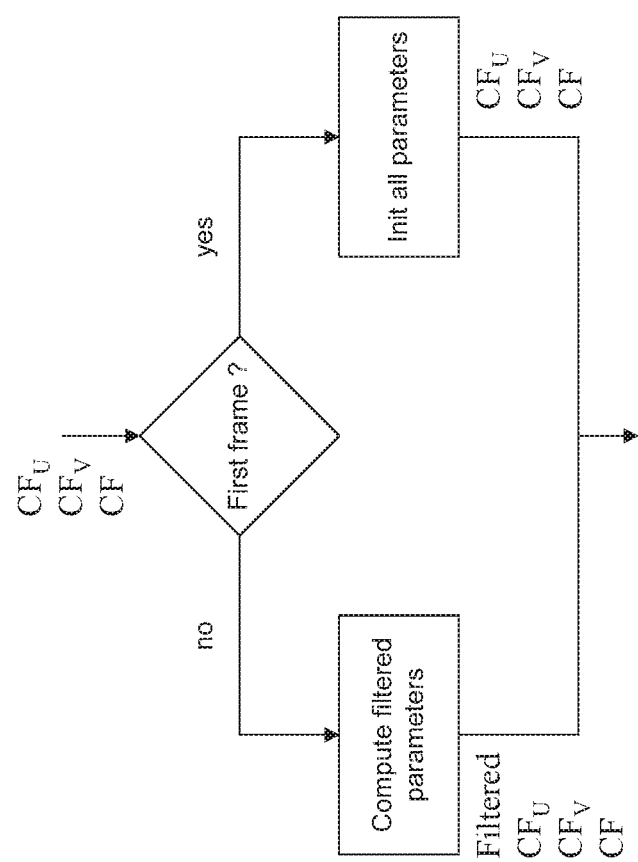
FIG. 7 shows a block diagram of a method for collecting the values of each of the correction factors over a pre-determined period of time in according with a second embodiment.

Inside a scene-cut, the correction factors are filtered as follows:

For each correction factor:
  updating the cumulative value cum_$CF_U$, cum_$CF_V$ (or cum_CF) by:
    substracting the oldest incoming correction factor value that corresponds to the one found at the current index. Substracting can be a simple or a weighted substraction of a combination between the oldest correction factor value and any of the following one
    adding the newest incoming correction factor value. Addition can be a simple or a weighted addition of a combination between the newest correction factor value and any of the preceding one.
  updating the buffer at the current index with the newest incoming correction factor.
  computing the filtered value for each correction factor. The filtered value can be for example:
    a simple division of the corresponding cumulated value with the size of the corresponding buffer;
    a division of the corresponding cumulated value with the number corresponding to the sum of weighted frames that were taken into account when computing the cumulated value;

FIG. 7 shows a block diagram of a method for collecting the values of each of the correction factors over a predetermined period of time in according with a second embodiment.

In this embodiment, no scene-cut detector is used or available in the system. The system is initialized when the first frame is received and then all values are filtered.

On FIGS. 1-4a and 6-7 the modules are functional units. In various embodiments, all, some, or none of these functional units correspond to distinguishable physical units. For example, these modules or some of them may be brought together in a unique component or circuit or contribute to functionalities of a software. As another example, some modules may be composed of separate physical entities. Various embodiments are implemented using either pure hardware, for example using dedicated hardware such as an ASIC or an FPGA or VLSI, respectively «Application Specific Integrated Circuit», «Field-Programmable Gate Array», «Very Large Scale Integration», or from several integrated electronic components embedded in an apparatus, or from a blend of hardware and software components.

Figure 5:
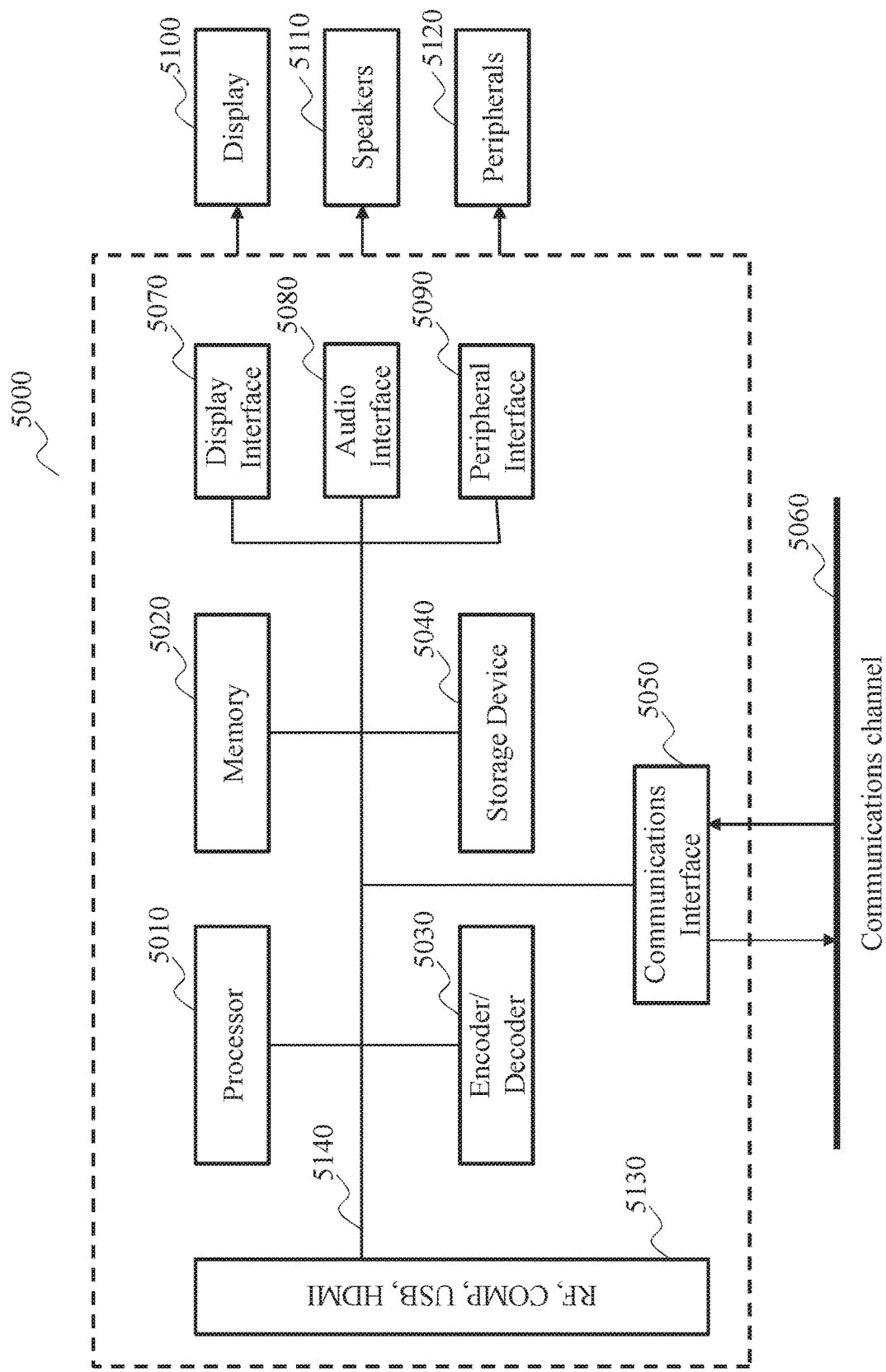
FIG. 5 illustrates a block diagram of an example of a system in which various aspects and embodiments are implemented.

FIG. 5 illustrates a block diagram of an example of a system in which various aspects and embodiments are implemented. System 5000 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 5000, singly or in combination, can be embodied in a single integrated circuit, multiple ICs, and/or discrete components. For example, in at least one embodiment, the processing and encoder/decoder elements of system 5000 are distributed across multiple ICs and/or discrete components. In various embodiments, the system 5000 is communicatively coupled to other similar systems, or to other electronic devices, via, for example, a communications bus or through dedicated input and/or output ports. In various embodiments, the system 5000 is configured to implement one or more of the aspects described in this document.

The system 5000 includes at least one processor 5010 configured to execute instructions loaded therein for implementing, for example, the various aspects described in this document. Processor 5010 can include embedded memory, input output interface, and various other circuitries as known in the art. The system 5000 includes at least one memory 5020 (e.g., a volatile memory device, and/or a non-volatile memory device). System 5000 includes a storage device 5040, which can include non-volatile memory and/or volatile memory, including, but not limited to, EEPROM, ROM, PROM, RAM, DRAM, SRAM, flash, magnetic disk drive, and/or optical disk drive. The storage device 5040 can include an internal storage device, an attached storage device, and/or a network accessible storage device, as non-limiting examples.

System 5000 includes an encoder/decoder module 5030 configured, for example, to process data to provide an encoded video or decoded video, and the encoder/decoder module 5030 can include its own processor and memory. The encoder/decoder module 5030 represents module(s) that can be included in a device to perform the encoding and/or decoding functions. As is known, a device can include one or both of the encoding and decoding modules. Additionally, encoder/decoder module 5030 can be implemented as a separate element of system 5000 or can be incorporated within processor 5010 as a combination of hardware and software as known to those skilled in the art.

Program code to be loaded onto processor 5010 or encoder/decoder 5030 to perform the various aspects described in this document can be stored in storage device 5040 and subsequently loaded onto memory 5020 for execution by processor 5010. In accordance with various embodiments, one or more of processor 5010, memory 5020, storage device 5040, and encoder/decoder module 5030 can store one or more of various items during the performance of the processes described in this document. Such stored items can include, but are not limited to, the input video, the decoded video or portions of the decoded video, a bitstream, matrices, variables, and intermediate or final results from the processing of equations, formulas, operations, and operational logic.

In several embodiments, memory inside of the processor 5010 and/or the encoder/decoder module 5030 is used to store instructions and to provide working memory for processing that is needed during encoding or decoding.

In other embodiments, however, a memory external to the processing device (for example, the processing device can be either the processor 5010 or the encoder/decoder module 5030) is used for one or more of these functions. The external memory can be the memory 5020 and/or the storage device 5040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 5000 can be provided through various input devices as indicated in block 5030. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 5030 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband.

In one set-top box embodiment, the RF portion and its associated input processing element receives an RF signal transmitted over a wired (for example, cable) medium, and performs frequency selection by filtering, down-converting, and filtering again to a desired frequency band.

Various embodiments rearrange the order of the above-described (and other) elements, remove some of these elements, and/or add other elements performing similar or different functions.

Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 5000 to other electronic devices across USB and/or HDMI connections. It is to be understood that various aspects of input processing, for example, Reed-Solomon error correction, can be implemented, for example, within a separate input processing IC or within processor 5010 as necessary. Similarly, aspects of USB or HDMI interface processing can be implemented within separate interface ICs or within processor 5010 as necessary. The demodulated, error corrected, and demultiplexed stream is provided to various processing elements, including, for example, processor 5010, and encoder/decoder 5030 operating in combination with the memory and storage elements to process the data stream as necessary for presentation on an output device.

Various elements of system 5000 can be provided within an integrated housing. Within the integrated housing, the various elements can be interconnected and transmit data therebetween using suitable connection arrangement, for example, an internal bus as known in the art, including the I2C bus, wiring, and printed circuit boards.

The system 5000 includes communication interface 5050 that enables communication with other devices via communication channel 5060. The communication interface 5050 can include, but is not limited to, a transceiver configured to transmit and to receive data over communication channel 5060. The communication interface 5050 can include, but is not limited to, a modem or network card and the communication channel 5060 can be implemented, for example, within a wired and/or a wireless medium.

Data is streamed to the system 5000, in various embodiments, using a Wi-Fi network such as IEEE 802.11. The Wi-Fi signal of these embodiments is received over the communications channel 5060 and the communications interface 5050 which are adapted for Wi-Fi communications. The communications channel 5060 of these embodiments is typically connected to an access point or router that provides access to outside networks including the Internet for allowing streaming applications and other over-the-top communications.

Other embodiments provide streamed data to the system 5000 using a set-top box that delivers the data over the HDMI connection of the input block 5030.

Still other embodiments provide streamed data to the system 5000 using the RF connection of the input block 5030.

It is to be appreciated that signaling can be accomplished in a variety of ways. For example, one or more syntax elements, flags, and so forth are used to signal information to a corresponding decoder in various embodiments.

The system 5000 can provide an output signal to various output devices, including a display 5100, speakers 5110, and other peripheral devices 5120. The other peripheral devices 5120 include, in various examples of embodiments, one or more of a stand-alone DVR, a disk player, a stereo system, a lighting system, and other devices that provide a function based on the output of the system 5000.

In various embodiments, control signals are communicated between the system 5000 and the display 5100, speakers 5110, or other peripheral devices 5120 using signaling such as AV.Link, CEC, or other communications protocols that enable device-to-device control with or without user intervention.

The output devices can be communicatively coupled to system 5000 via dedicated connections through respective interfaces 5070, 5080, and 5090.

Alternatively, the output devices can be connected to system 5000 using the communications channel 5060 via the communications interface 5050. The display 5100 and speakers 5110 can be integrated in a single unit with the other components of system 5000 in an electronic device such as, for example, a television.

In various embodiments, the display interface 5070 includes a display driver, such as, for example, a timing controller (T Con) chip.

The display 5100 and speaker 5110 can alternatively be separate from one or more of the other components, for example, if the RF portion of input 5130 is part of a separate set-top box. In various embodiments in which the display 5100 and speakers 5110 are external components, the output signal can be provided via dedicated output connections, including, for example, HDMI ports, USB ports, or COMP outputs.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, any other device for processing an image or a video, and any other communication apparatus. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage media, is merely an illustrative and not exhaustive listing as is readily appreciated by one of ordinary skill in the art: a portable computer; a floppy disk; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium (also referred to as a computer readable medium or a computer readable storage medium). Instructions may be, for example, in hardware, firmware, software, or a combination. Instructions may be found in, for example, an operating system, a separate application, or a combination of the two. A processor may be characterized, therefore, as, for example, both an apparatus configured to carry out a process and an apparatus that includes a processor-readable medium (such as a storage apparatus) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example, or to carry as data the actual syntax-values written by a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
    deriving a pair of scaled chroma components by performing a chroma correction based on a chroma correction function for correcting chroma components representing the chroma of an input image according to a first component representing a mapping of a luminance component of said input image used for reducing or increasing the dynamic range of said luminance component, and a reconstructed component representing an inverse mapping of said first component;
    obtaining at least one correction factor according to said at least one of the pair of scaled chroma components;
    wherein the at least one correction factor is a result of dividing at least one of the pair of scaled chroma components by a value; and
    encoding in a bitstream data comprising information representative of at least the pair of scaled chroma components and metadata used to convey an information data representative of said chroma correction function and said at least one correction factor.

2. The method of claim 1, wherein the at least one correction factor is encoded in a corrected color space matrix conversion by dividing the values of a theoretical color space matrix conversion by the at least one correction factor.

3. The method of claim 1, wherein said information data represent coefficients of a matrix.

4. The method of claim 1, wherein a single correction factor is used, the single correction factor being:
    a maximum of a result of dividing each of the pair of scaled chroma components by a value; or
    an average of a result of dividing each of the pair of scaled chroma components by a value.

5. A device comprising:
    a processor configured to:
        derive a pair of scaled chroma components by performing a chroma correction based on a chroma correction function for correcting chroma components representing the chroma of an input image according to a first component representing a mapping of a luminance component of said input image used for reducing or increasing the dynamic range of said luminance component, and a reconstructed component representing an inverse mapping of said first component;
        obtain at least one correction factor according to said at least one of the pair of scaled chroma components;

wherein the at least one correction factor is a result of dividing at least one of the pair of scaled chroma components by a value; and encode in a bitstream data comprising information representative of at least the pair of scaled chroma components and metadata used to convey an information data representative of said chroma correction function and said at least one correction factor.

6. The device of claim 5, wherein the at least one correction factor is encoded in a corrected color space matrix conversion by dividing the values of a theoretical color space matrix conversion by the at least one correction factor.

7. The device of claim 5, wherein said information data represent coefficients of a matrix.

8. The method of claim 5, wherein a single second correction factor is used, the single correction factor being:
a maximum of a result of dividing each of the pair of scaled chroma components by a value; or
an average of a result of dividing each of the pair of scaled chroma components by a value.

9. A method comprising:
obtaining from a bitstream information representative of a pair of scaled chroma components and metadata used to convey an information data representative of a chroma correction function and at least one a correction factor;
obtaining at least one corrected chroma correction function by multiplying the chroma correction function by the at least one correction factor;
obtaining refined scaled chroma components by multiplying scaled chroma components of an image by said at least one corrected chroma correction function; and
reconstructing a corrected image by deriving components of the reconstructed corrected image as a function of said refined scaled chroma components and a corrected matrix resulting from the division of coefficients of an inverse of a theoretical color space matrix conversion by the at least one correction factor.

10. The method of claim 9, wherein the at least one correction factor is derived from the corrected matrix.

11. The method of claim 9, wherein the values of the at least one correction factor are collected over a pre-determined period of time preceding a current time, and at the current time a filtered version of the at least one correction factor is delivered.

12. The method of claim 9, wherein a single correction factor is used, the single correction factor being:
a maximum of a result of dividing each of the pair of scaled chroma components by a value; or
an average of a result of dividing each of the pair of scaled chroma components by a value.

13. A device comprising:
a processor configured to:
obtain from a bitstream information representative of a pair of scaled chroma components and metadata used to convey an information data representative of a chroma correction function and at least one correction factor;
obtain at least one corrected chroma correction function by multiplying the chroma correction function by the at least one correction factor;
obtain refined scaled chroma components by multiplying scaled chroma components of an image by said at least one corrected chroma correction function; and
reconstruct a corrected image by deriving components of the reconstructed corrected image as a function of said refined scaled chroma components and a corrected matrix resulting from the division of coefficients of an inverse of a theoretical color space matrix conversion by the at least one correction factor.

14. The device of claim 13, wherein the at least one correction factor is derived from the corrected matrix.

15. The device of claim 14, wherein the values of the at least one correction factor are collected over a pre-determined period of time preceding a current time, and at the current time a filtered version of the at least one correction factor is delivered.

16. The device of claim 13, wherein a single correction factor is used, the single correction factor being:
a maximum of a result of dividing each of the pair of scaled chroma components by a value; or
an average of a result of dividing each of the pair of scaled chroma components by a value.

17. A non-transitory computer readable storage medium comprising instructions which when executed by a computer cause the computer to carry out the method of claim 1.

18. A non-transitory computer readable storage medium comprising instructions which when executed by a computer cause the computer to carry out the method of claim 9.

* * * * *